US009977545B2

(12) United States Patent
Koito et al.

(10) Patent No.: US 9,977,545 B2
(45) Date of Patent: May 22, 2018

(54) DISPLAY DEVICE WITH TOUCH DETECTION FUNCTION AND ELECTRONIC APPARATUS

(71) Applicant: Japan Display Inc., Tokyo (JP)

(72) Inventors: Takeo Koito, Tokyo (JP); Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 49 days.

(21) Appl. No.: 14/201,115

(22) Filed: Mar. 7, 2014

(65) Prior Publication Data
US 2014/0292710 A1    Oct. 2, 2014

(30) Foreign Application Priority Data

Mar. 27, 2013  (JP) ................................. 2013-067641

(51) Int. Cl.
*G06F 3/044*    (2006.01)
*G06F 3/041*    (2006.01)

(52) U.S. Cl.
CPC ............ *G06F 3/044* (2013.01); *G06F 3/0416* (2013.01); *G06F 3/0418* (2013.01)

(58) Field of Classification Search
CPC ........... G06F 3/044; G06F 2203/04112; G06F 3/0412; G06F 3/0418; G06F 3/0416; G02F 1/13338; G02F 1/134336
(Continued)

(56) References Cited

U.S. PATENT DOCUMENTS 9,052,766 B2 * 6/2015 Dunphy ................ G06F 3/0412
2009/0273577 A1 * 11/2009 Chen ....................... G06F 3/044
345/174
(Continued)

FOREIGN PATENT DOCUMENTS

JP    11-110115       4/1999
JP    11110115 A  *  4/1999
(Continued)

OTHER PUBLICATIONS

Japanese Office Action dated Aug. 4, 2015 in corresponding Japanese Application No. 2013-067641.
(Continued)

*Primary Examiner* — Amare Mengistu
*Assistant Examiner* — Gloryvid Figueroa-Gibson
(74) *Attorney, Agent, or Firm* — K&L Gates LLP

(57) ABSTRACT

According to an aspect, a display device with a touch detection function includes: a substrate; a display area in which pixels each constituted by different color regions are arranged in a matrix and that includes color columns in which the color regions of the same colors extend side by side; a touch detection electrode that includes a plurality of conductive thin wires; and a drive electrode. Each of the conductive thin wires includes a plurality of portions at each of which the conductive thin wire extends in a direction at an angle with respect to a direction of extension of the color regions, and a plurality of bent portions at each of which the conductive thin wire is bent with the angle changed. The conductive thin wires include portions each overlapping all of the color columns in a direction orthogonal to the surface of the substrate.

9 Claims, 19 Drawing Sheets

(58) Field of Classification Search
USPC .......................... 345/174; 178/18.069, 18.06
See application file for complete search history.

(56) References Cited

U.S. PATENT DOCUMENTS

| | | |
|---|---|---|
| 2010/0214262 A1 | 8/2010 | Ishizaki et al. |
| 2013/0063371 A1* | 3/2013 | Lee .................... G06F 3/044 |
| | | 345/173 |
| 2013/0278528 A1 | 10/2013 | Ishizaki et al. |
| 2014/0049503 A1* | 2/2014 | Cok ...................... 345/174 |
| 2014/0292710 A1 | 10/2014 | Koito et al. |

FOREIGN PATENT DOCUMENTS

| | | |
|---|---|---|
| JP | 2010-197576 | 9/2010 |
| KR | 10-2013-0027747 | 3/2013 |
| TW | 201310597 | 1/2013 |

OTHER PUBLICATIONS

Taiwan Office Action dated Sep. 17, 2015 in corresponding Taiwan Application No. 103109155.
Korean Office Action dated Jun. 30, 2015 in corresponding Korean Application No. 10-2014-0033296.

* cited by examiner

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2013-067641 filed in the Japan Patent Office on Mar. 27, 2013, the entire content of which is hereby incorporated by reference.

BACKGROUND

1. Technical Field

The present disclosure relates to a display device and an electronic apparatus that are capable of detecting an external proximity object, and particularly to a display device with a touch detection function and an electronic apparatus that are capable of detecting an external proximity object based on a change in electrostatic capacitance.

2. Description of the Related Art

In recent years, a touch detection device commonly called a touch panel that can detect an external proximity object has attracted attention. The touch panel is mounted on or integrated with a display device, such as a liquid crystal display device, and is used in a display device with a touch detection function. The display device with the touch detection function displays various button images, for example, on the display device so as to allow information input by using the touch panel as a substitute for typical mechanical buttons. The display device with the touch detection function having the touch panel as described above does not need an input device, such as a keyboard, a mouse, and a keypad, and thus tends to be more widely used also in a computer, a portable information terminal, such as a mobile phone, and so on.

Several types of the touch detection device exist, such as an optical type, a resistance type, and an electrostatic capacitance type. Using the electrostatic capacitance type touch detection device in the portable information terminal, for example, can achieve apparatuses that have a relatively simple structure and consume low power. For example, Japanese Patent Application Laid-open Publication No. 2010-197576 (JP-A-2010-197576) discloses a touch panel in which a translucent electrode pattern is made invisible.

The display device with the touch detection function is further required to have lower-resistance touch detection electrodes to achieve a smaller thickness, a larger screen size, or a higher definition. A translucent conductive oxide such as indium tin oxide (ITO) is used as a material of translucent electrodes for the touch detection electrodes. An electrically conductive material such as a metallic material is effectively used for reducing the resistance of the touch detection electrodes. However, using the electrically conductive material such as a metallic material can cause a moire pattern to be seen due to interference between pixels of the display device and the electrically conductive material such as a metallic material.

For the foregoing reasons, there is a need for a display device with a touch detection function and an electronic apparatus that can reduce the possibility of a moire pattern being seen, while including touch detection electrodes of an electrically conductive material such as a metallic material.

SUMMARY

According to an aspect, a display device with a touch detection function includes: a substrate; a display area in which pixels each constituted by different color regions are arranged in a matrix in a plane parallel to a surface of the substrate and that includes color columns in which the color regions of the same colors extend side by side; a touch detection electrode that includes a plurality of conductive thin wires extending in a plane parallel to the surface of the substrate; and a drive electrode that has electrostatic capacitance with respect to the touch detection electrode. Each of the conductive thin wires includes a plurality of portions at each of which the conductive thin wire extends in a direction at an angle with respect to a direction of extension of the color regions, and a plurality of bent portions at each of which the conductive thin wire is bent with the angle changed. The conductive thin wires include portions each overlapping all of the color columns in a direction orthogonal to the surface of the substrate.

According to another aspect, an electronic apparatus includes a display device with a touch detection function that includes: a substrate; a display area in which pixels each constituted by different color regions are arranged in a matrix in a plane parallel to a surface of the substrate and that includes color columns in which the color regions of the same colors extend side by side; a touch detection electrode that includes a plurality of conductive thin wires extending in a plane parallel to the surface of the substrate; and a drive electrode that has electrostatic capacitance with respect to the touch detection electrode. Each of the conductive thin wires includes a plurality of portions at each of which the conductive thin wire extends in a direction at an angle with respect to a direction of extension of the color regions, and a plurality of bent portions at each of which the conductive thin wire is bent with the angle changed. The conductive thin wires include portions each overlapping all of the color columns in a direction orthogonal to the surface of the substrate.

Additional features and advantages are described herein, and will be apparent from the following Detailed Description and the figures.

DETAILED DESCRIPTION

An embodiment for practicing the present disclosure will be described in detail with reference to the accompanying drawings. The description of the embodiment below will not limit the present disclosure. The constituent elements described below include elements that can easily be envisaged by those skilled in the art and substantially identical elements. The constituent elements described below can also be combined as appropriate. The description will be made in the following order.

1. Embodiment (display device with touch detection function)

2. Application examples (electronic apparatuses)

Figure 1:
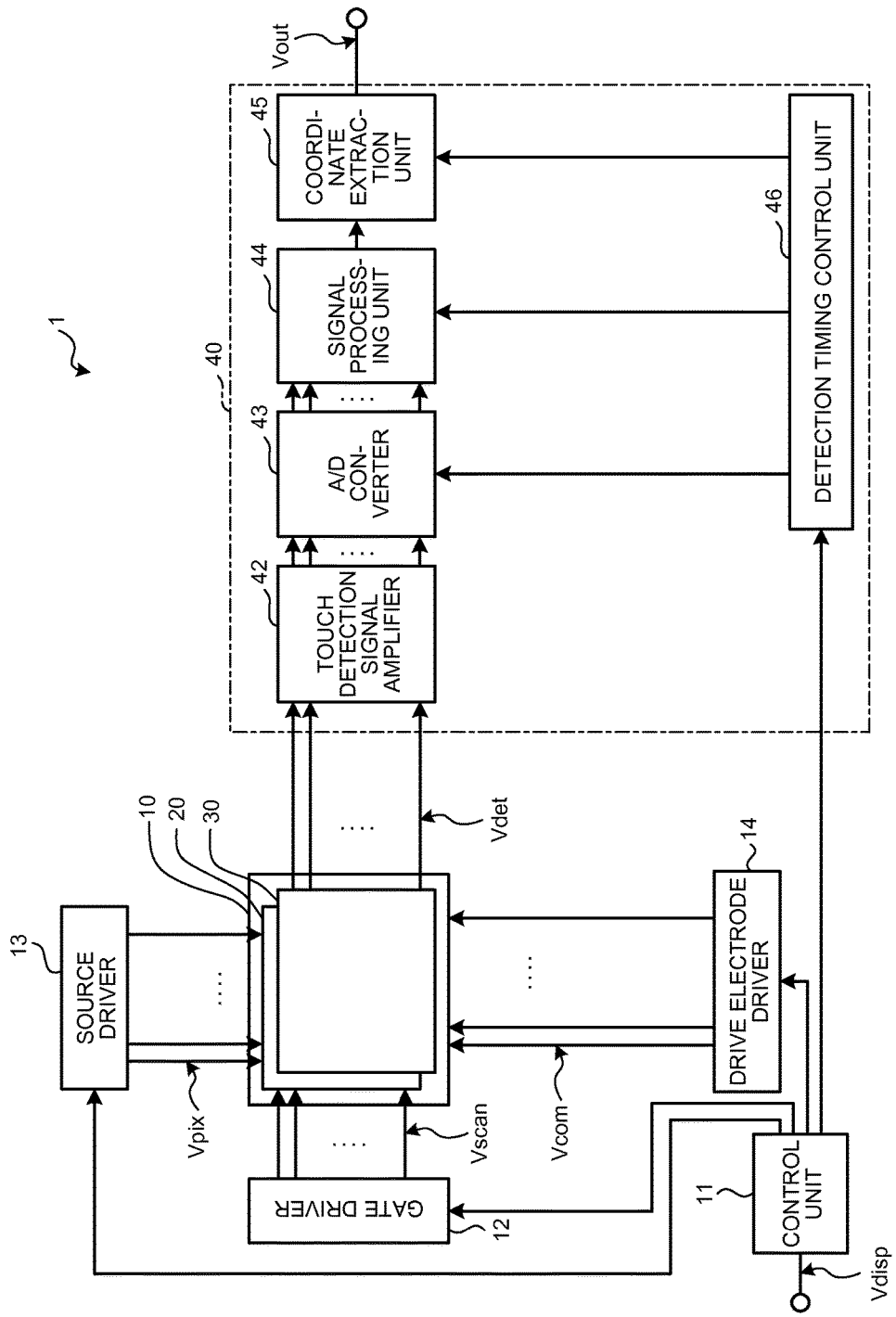
FIG. 1 is a block diagram illustrating a configuration example of a display device with a touch detection function according to an embodiment of the present disclosure.

Examples in which a display device with a touch detection function according to the above-mentioned embodiment is applied to electronic apparatuses 3. Aspects of present disclosure 1. Embodiment 1-1. Configuration Examples Overall Configuration Example FIG. 1 is a block diagram illustrating a configuration example of a display device with a touch detection function according to an embodiment. This display device with a touch detection function 1 includes a display unit with a touch detection function 10, a control unit 11, a gate driver 12, a source driver 13, a drive electrode driver 14, and a touch detection unit 40. The display device with the touch detection function 1 is a display device in which the display unit with the touch detection function 10 has a built-in touch detection function. The display unit with the touch detection function 10 is a device obtained by integrating a liquid crystal display unit 20 using liquid crystal display elements as display elements with an electrostatic capacitance type touch detection device 30. The display unit with the touch detection function 10 may be a device obtained by mounting the electrostatic capacitance type touch detection device 30 on the liquid crystal display unit 20 using the liquid crystal display elements as the display elements. The liquid crystal display unit 20 may be, for example, an organic EL display device.

The liquid crystal display unit 20 is a device that performs display by sequentially scanning on each horizontal line according to a scan signal Vscan supplied from the gate driver 12, as will be described later. The control unit 11 is a circuit that supplies control signals to each of the gate driver 12, the source driver 13, the drive electrode driver 14, and the touch detection unit 40 based on an externally supplied video signal Vdisp, control signals to each of the gate driver 12, and thus controls them so as to operate in synchronization with each other.

The gate driver 12 has a function to sequentially select one horizontal line to be display-driven by the display unit with the touch detection function 10 based on the control signal supplied from the control unit 11.

The source driver 13 is a circuit that supplies pixel signals Vpix to respective sub-pixels SPix (to be described later) of the display unit with the touch detection function 10 based on the control signal supplied from the control unit 11.

The drive electrode driver 14 is a circuit that supplies a drive signal Vcom to drive electrodes COML (to be described later) of the display unit with the touch detection function 10 based on the control signal supplied from the control unit 11.

The touch detection unit 40 is a circuit that detects existence of a touch (a contact or proximity state which will be described later) to the touch detection device 30 based on the control signal supplied from the control unit 11 and touch detection signals Vdet supplied from the touch detection device 30 of the display unit with the touch detection function 10. If a touch exists, the touch detection device 30 obtains, for example, coordinates of the touch in a touch detection region. The touch detection unit 40 includes a touch detection signal amplifier 42, an A/D converter 43, a signal processing unit 44, a coordinate extraction unit 45, and a detection timing control unit 46.

The touch detection signal amplifier 42 amplifies the touch detection signals Vdet supplied from the touch detection device 30. The touch detection signal amplifier 42 may include a low-pass analog filter that removes high-frequency components (noise components) included in the touch detection signals Vdet to extract touch components, and outputs each of the touch components.

Basic Principle of Electrostatic Capacitance Type Touch Detection

Figure 2:
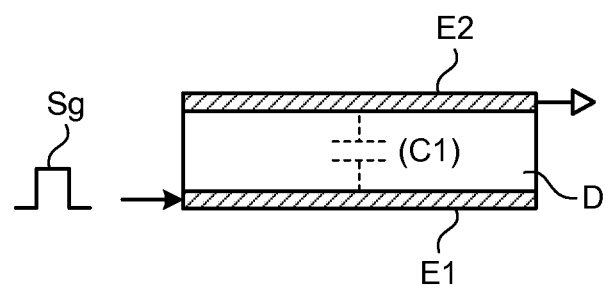
FIG. 2 is an explanatory diagram illustrating a state in which a finger is neither in contact with nor in proximity of a device for explaining a basic principle of an electrostatic capacitance type touch detection system.
Figure 3:
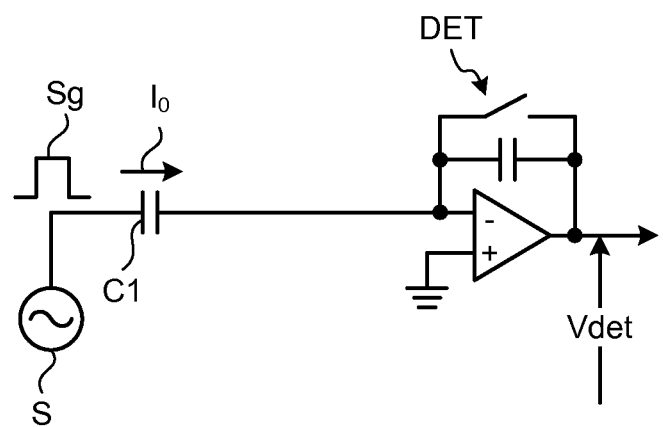
FIG. 3 is an explanatory diagram illustrating an example of an equivalent circuit in the state illustrated in FIG. 2 in which a finger is neither in contact with nor in proximity of a device.
Figure 4:
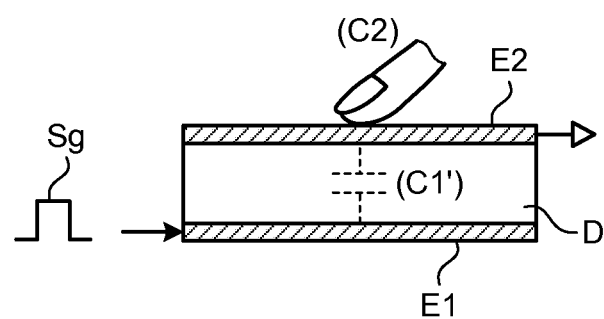
FIG. 4 is an explanatory diagram illustrating a state in which a finger is in contact with or in proximity of a device for explaining the basic principle of the electrostatic capacitance type touch detection system.
Figure 5:
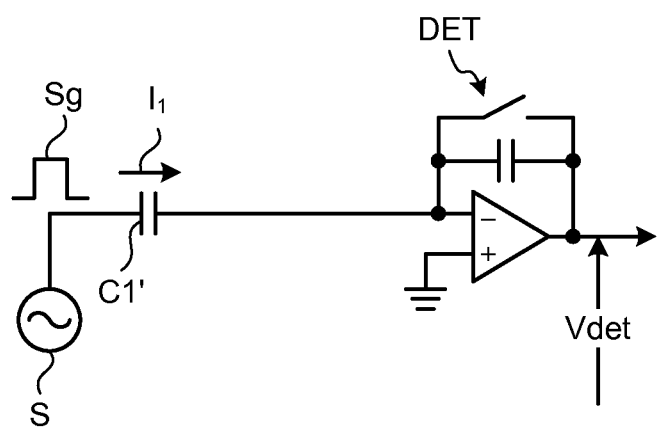
FIG. 5 is an explanatory diagram illustrating an example of the equivalent circuit in the state illustrated in FIG. 4 in which a finger is in contact with or in proximity of a device.
Figure 6:
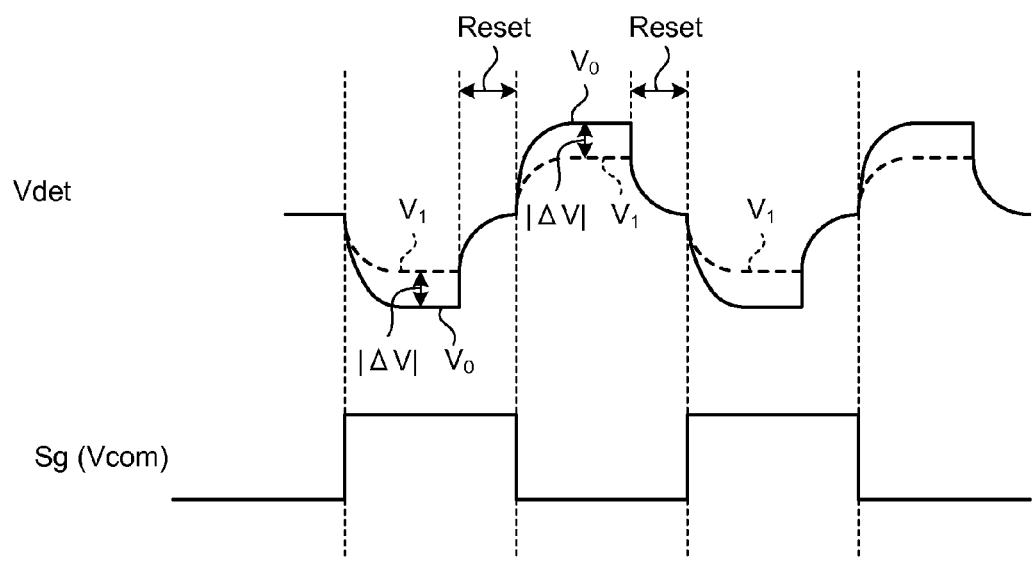
FIG. 6 is a diagram illustrating an example of waveforms of a drive signal and a touch detection signal.

The touch detection device 30 operates based on a basic principle of electrostatic capacitance type touch detection, and outputs the touch detection signals Vdet. A description will be made of the basic principle of the touch detection in the display device with the touch detection function 1 of the embodiment with reference to FIGS. 1 to 6. FIG. 2 is an explanatory diagram illustrating a state in which a finger is neither in contact with nor in proximity of a device for explaining the basic principle of the electrostatic capacitance type touch detection system. FIG. 3 is an explanatory diagram illustrating an example of an equivalent circuit in the state illustrated in FIG. 2 in which a finger is neither in contact with nor in proximity of a device. FIG. 4 is an explanatory diagram illustrating a state in which a finger is in contact with or in proximity of a device for explaining the basic principle of the electrostatic capacitance type touch detection system. FIG. 5 is an explanatory diagram illustrating an example of the equivalent circuit in the state illustrated in FIG. 4 in which a finger is in contact with or in proximity of a device. FIG. 6 is a diagram illustrating an example of waveforms of the drive signal and the touch detection signal.

For example, as illustrated in FIGS. 2 and 4, capacitive elements C1 and C1' include each a pair of electrodes, that is, a drive electrode E1 and a touch detection electrode E2 that are arranged opposite to each other with a dielectric body D interposed therebetween. As illustrated in FIG. 3, one end of the capacitive element C1 is coupled to an alternating signal source (drive signal source) S, and the other end thereof is coupled to a voltage detector (touch detection unit) DET. The voltage detector DET is, for example, an integration circuit included in the touch detection signal amplifier 42 illustrated in FIG. 1.

Applying an alternating-current rectangular wave Sg having a predetermined frequency (such as approximately several kilohertz to several hundred kilohertz) from the alternating signal source S to the drive electrode E1 (one end of the capacitive element C1) causes an output waveform (touch detection signal Vdet) to occur via the voltage detector DET coupled to the side of the touch detection electrode E2 (the other end of the capacitive element C1). The alternating-current rectangular wave Sg corresponds to a touch drive signal Vcomt which will be described later.

In the state in which the finger is not in contact with (nor in proximity of) the device (non-contact state), a current $I_0$ corresponding to a capacitance value of the capacitive element C1 flows in association with the charge and discharge of the capacitive element C1, as illustrated in FIGS. 2 and 3. As illustrated in FIG. 6, the voltage detector DET converts a variation in the current $I_0$ corresponding to the alternating-current rectangular wave Sg into a variation in a voltage (waveform $V_0$ indicated by a solid line).

In the state in which the finger is in contact with (or in proximity of) the device (contact state), electrostatic capacitance C2 generated by the finger is in contact with or in proximity of the touch detection electrode E2, as illustrated in FIG. 4. Thus, a fringe component of the electrostatic capacitance between the drive electrode E1 and the touch detection electrode E2 is interrupted, and the capacitive element C1' having a smaller capacitance value than that of the capacitive element C1 is obtained. Referring to the equivalent circuit illustrated in FIG. 5, a current $I_1$ flows through the capacitive element C1'. As illustrated in FIG. 6, the voltage detector DET converts a variation in the current $I_1$ corresponding to the alternating-current rectangular wave Sg into a variation in a voltage (waveform $V_1$ indicated by a dotted line). In this case, the waveform $V_1$ has a smaller amplitude than that of the above-described waveform $V_0$. This indicates that an absolute value $|\Delta V|$ of a voltage difference between the waveform $V_0$ and the waveform $V_1$ changes according to an influence of an object, such as a finger, approaching from the outside. To accurately detect the absolute value $|\Delta V|$ of the voltage difference between the waveform $V_0$ and the waveform $V_1$, the voltage detector DET preferably performs an operation including a period Reset during which the charge or discharge of the capacitor is reset by switching in the circuit in accordance with the frequency of the alternating-current rectangular wave Sg.

The touch detection device 30 illustrated in FIG. 1 is configured to perform the touch detection by sequentially scanning one detection block at a time according to the drive signals Vcom (touch drive signals Vcomt to be described later) supplied from the drive electrode driver 14.

The touch detection device 30 is configured to output the touch detection signals Vdet for each detection block from a plurality of touch detection electrodes TDL (to be described later) via the voltage detectors DET illustrated in FIG. 3 or 5, and supply the touch detection signals Vdet to the touch detection signal amplifier 42 of the touch detection unit 40.

The A/D converter 43 is a circuit that samples each analog signal output from the touch detection signal amplifier 42 at a timing synchronized with the drive signals Vcom, and converts the sampled analog signal into a digital signal.

The signal processing unit 44 includes a digital filter that reduces frequency components (noise components) included in the output signals of the A/D converter 43 other than the frequency at which the drive signals Vcom have been sampled. The signal processing unit 44 is a logic circuit that detects existence of a touch to the touch detection device 30 based on the output signals of the A/D converter 43. The signal processing unit 44 performs processing to extract only a difference of voltage caused by the finger. The difference of voltage caused by the finger is the absolute value $|\Delta V|$ of the difference between the waveform $V_0$ and the waveform $V_1$ described above. The signal processing unit 44 may perform a calculation of averaging the absolute values $|\Delta V|$ per detection block to obtain an average value of the absolute values $|\Delta V|$. This allows the signal processing unit 44 to reduce the influence of the noise. The signal processing unit 44 compares the detected difference of voltage caused by the finger with a predetermined threshold voltage. The signal processing unit 44 determines that the state is the contact state of the external proximity object approaching from the outside if the difference of voltage is equal to or larger than the threshold voltage, and determines that the state is the non-contact state of the external proximity object if the difference of voltage is smaller than the threshold voltage. The touch detection unit 40 can perform the touch detection in this manner.

The coordinate extraction unit 45 is a logic circuit that obtains touch panel coordinates of a touch when the touch is detected in the signal processing unit 44. The detection timing control unit 46 performs control so as to operate the A/D converter 43, the signal processing unit 44, and the coordinate extraction unit 45 in synchronization with each other. The coordinate extraction unit 45 outputs the touch panel coordinates as a signal output Vout.

Module

Figure 7:
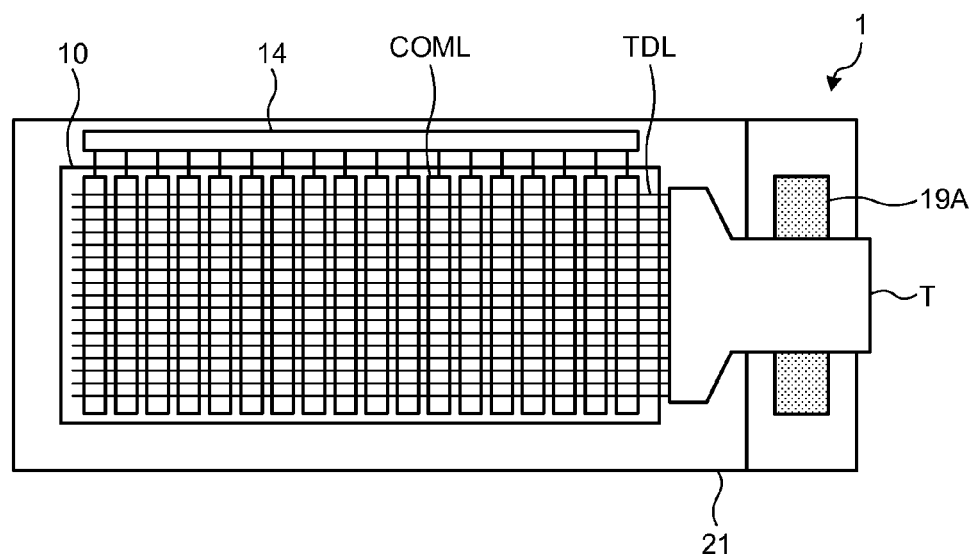
FIG. 7 is a diagram illustrating an example of a module on which the display device with the touch detection function is mounted.
Figure 8:
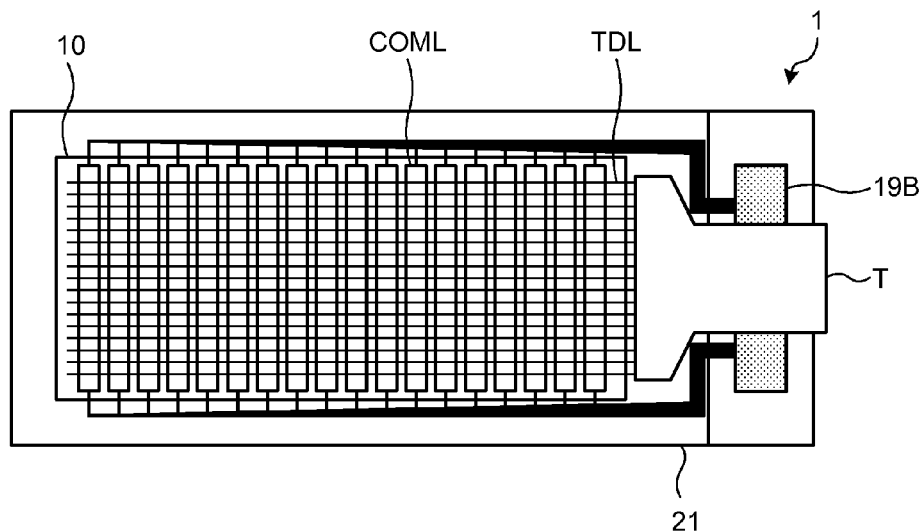
FIG. 8 is a diagram illustrating an example of a module on which the display device with the touch detection function is mounted.

FIGS. 7 and 8 are diagrams each illustrating an example of a module on which the display device with the touch detection function is mounted. When the display device with the touch detection function 1 is mounted on a module, the above-described drive electrode driver 14 may be formed on a TFT substrate 21 that is a glass substrate, as illustrated in FIG. 7.

As illustrated in FIG. 7, the display device with the touch detection function 1 includes the display unit with the touch detection function 10, the drive electrode driver 14, and a chip on glass (COG) 19A. FIG. 7 schematically illustrates the drive electrodes COML and the touch detection electrodes TDL in the display unit with a touch detection function 10 viewed in a direction orthogonal to a surface of the TFT substrate 21 to be described later. The drive electrodes COML and the touch detection electrodes TDL are formed so as to three-dimensionally intersect the drive electrodes COML. Specifically, the drive electrodes COML are formed in a direction along one side of the display unit with the touch detection function 10, and the touch detection electrodes TDL are formed in a direction along the other side of the display unit with the touch detection function 10. The output terminal of the touch detection electrodes TDL is coupled to the touch detection unit 40 mounted outside this module via a terminal unit T that is provided at the above-described other side of the display unit with the touch detection function 10 and is composed of a flexible substrate, for example. The drive electrode driver 14 is formed on the TFT substrate 21 that is a glass substrate. The COG 19A is a chip mounted on the TFT substrate 21, and includes built-in circuits necessary for a display operation, such as the control unit 11, the gate driver 12, and the source driver 13 illustrated in FIG. 1. The drive electrode driver 14 may be built into the COG of the display device with the touch detection function 1, as illustrated in FIG. 8.

As illustrated in FIG. 8, the module, on which the display device with the touch detection function 1 is mounted, includes a COG 19B. The COG 19B illustrated in FIG. 8 incorporates therein the drive electrode driver 14 in additions to the above-described circuits necessary for the display operation. In the display operation, the display device with the touch detection function 1 performs line-sequential scanning on each horizontal line, as will be described later. In a touch detection operation, the display device with the touch detection function 1 performs the line-sequential scanning on each detection line by sequentially applying the drive signals Vcom to the drive electrodes COML.

Display Unit with Touch Detection Function

Figure 9:
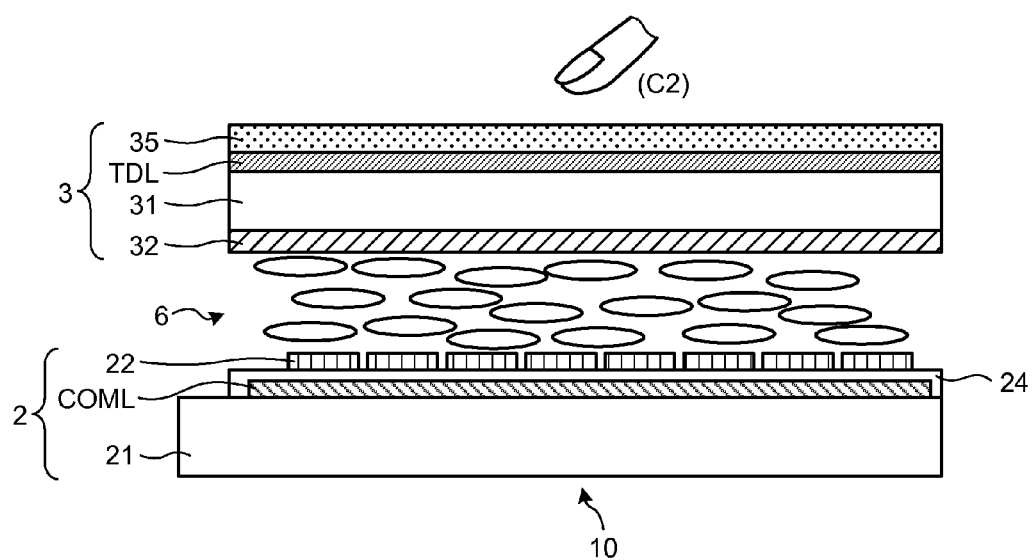
FIG. 9 is a cross-sectional view illustrating a schematic cross-sectional structure of a display unit with a touch detection function according to the embodiment.
Figure 10:
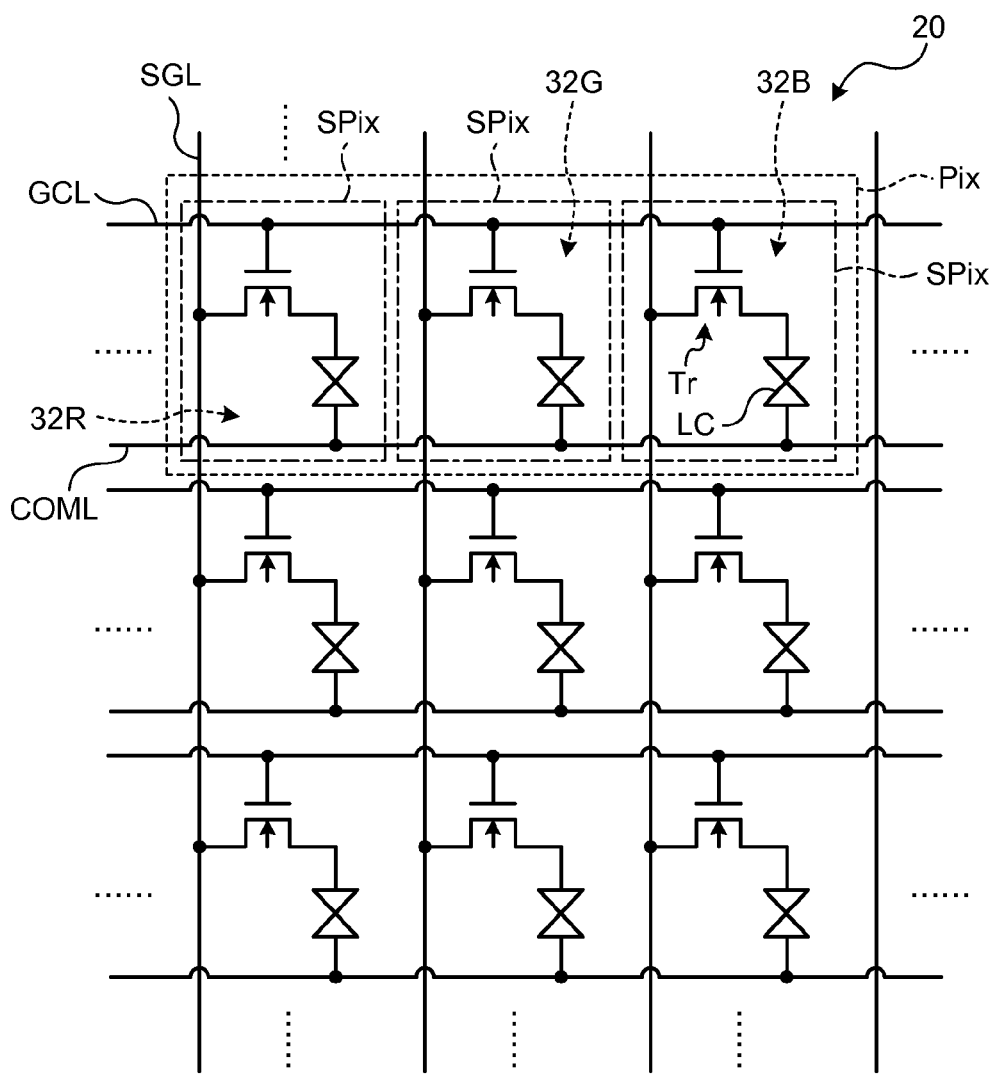
FIG. 10 is a circuit diagram illustrating a pixel arrangement of the display unit with the touch detection function according to the embodiment.

A configuration example of the display unit with the touch detection function 10 will be described below in detail. FIG. 9 is a cross-sectional view illustrating a schematic cross-sectional structure of the display unit with the touch detection function according to the embodiment. FIG. 10 is a circuit diagram illustrating a pixel arrangement of the display unit with the touch detection function according to the embodiment. The display unit with the touch detection function 10 includes a pixel substrate 2, a counter substrate 3 arranged facing a surface of the pixel substrate 2 in the direction orthogonal thereto, and a liquid crystal layer 6 inserted between the pixel substrate 2 and the counter substrate 3.

The pixel substrate 2 includes the TFT substrate 21 as a circuit substrate, a plurality of pixel electrodes 22 arranged in a matrix above the TFT substrate 21, the drive electrodes COML formed between the TFT substrate 21 and the pixel electrodes 22, and an insulation layer 24 insulating the pixel electrodes 22 from the drive electrodes COML. The TFT substrate 21 is provided with thin-film transistor (TFT) elements Tr of the respective sub-pixels SPix illustrated in FIG. 10, and with wiring, including signal lines SGL that supply the pixel signals Vpix to the respective pixel electrodes 22 illustrated in FIG. 9 and scan lines GCL that drive the respective TFT elements Tr. In this manner, the signal lines SGL extend in a plane parallel to the surface of the TFT substrate 21, and supply the pixel signals Vpix for displaying an image to the pixels. The liquid crystal display unit 20 illustrated in FIG. 10 includes the sub-pixels SPix arranged in a matrix. Each of the sub-pixels SPix includes the TFT element Tr and a liquid crystal element LC. The TFT element Tr is constituted by a thin-film transistor, and in the present example, constituted by an n-channel metal oxide semiconductor (MOS) TFT. One of the source and the drain of the TFT element Tr is coupled to each of the signal lines SGL; the gate thereof is coupled to each of the scan lines GCL; and the other of the source and the drain thereof is coupled to one end of the liquid crystal element LC. One end of the liquid crystal element LC is coupled, for example, to the drain of the TFT element Tr, and the other end thereof is coupled to each of the drive electrodes COML.

The sub-pixel SPix illustrated in FIG. 10 is coupled by the scan line GCL with other sub-pixels SPix belonging to the same row of the liquid crystal display unit 20. The scan line GCL is coupled with the gate driver 12, and is supplied with the scan signal Vscan from the gate driver 12. The sub-pixel SPix is coupled with another sub-pixel SPix belonging to the same column of the liquid crystal display unit 20 via the signal line SGL. The signal line SGL is coupled with the source driver 13, and is supplied with the pixel signals Vpix from the source driver 13. The sub-pixel SPix is further coupled with another sub-pixel SPix belonging to the same row of the liquid crystal display unit 20 via the drive electrode COML. The drive electrode COML is coupled with the drive electrode driver 14, and is supplied with the drive signal Vcom from the drive electrode driver 14. This means that the sub-pixels SPix belonging to the same one of the rows share one of the drive electrodes COML, in the present example. The drive electrodes COML of the embodiment extend parallel to the direction of extension of the scan lines GCL. The direction of extension of the drive electrodes COML of the embodiment may be, for example, but not limited to, a direction parallel to the direction of extension of the signal lines SGL.

The gate driver 12 illustrated in FIG. 1 applies the scan signals Vscan to the gates of the TFT elements Tr of pixels Pix via the scan line GCL illustrated in FIG. 10 so as to sequentially select, as a target of display driving, one row (one horizontal line) of the sub-pixels SPix formed in a matrix on the liquid crystal display unit 20. The source driver 13 illustrated in FIG. 1 supplies the pixel signals Vpix to the respective sub-pixels SPix constituting one horizontal line sequentially selected by the gate driver 12 via the signal lines SGL illustrated in FIG. 10. The sub-pixels SPix are configured to display one horizontal line according to the pixel signals Vpix thus supplied. The drive electrode driver 14 illustrated in FIG. 1 applies the drive signals Vcom to the drive electrodes COML in each block consisting of a pre-determined number of the drive electrodes COML illustrated in FIGS. 7 and 8, and thus drives the drive electrodes COML of each a block.

As describe above, the gate driver 12 sequentially selects a horizontal line on the liquid crystal display unit 20 by driving the scan line GCL so as to perform the line-sequential scanning in a time-division manner. The source driver 13 supplies the pixel signals Vpix to the sub-pixels SPix belonging to the horizontal line so as to perform the display on the liquid crystal display unit 20 on a horizontal line by horizontal line basis. The drive electrode driver 14 is configured to apply the drive signals Vcom to the block including the drive electrodes COML corresponding to the horizontal line while this display operation is performed.

Figure 11:
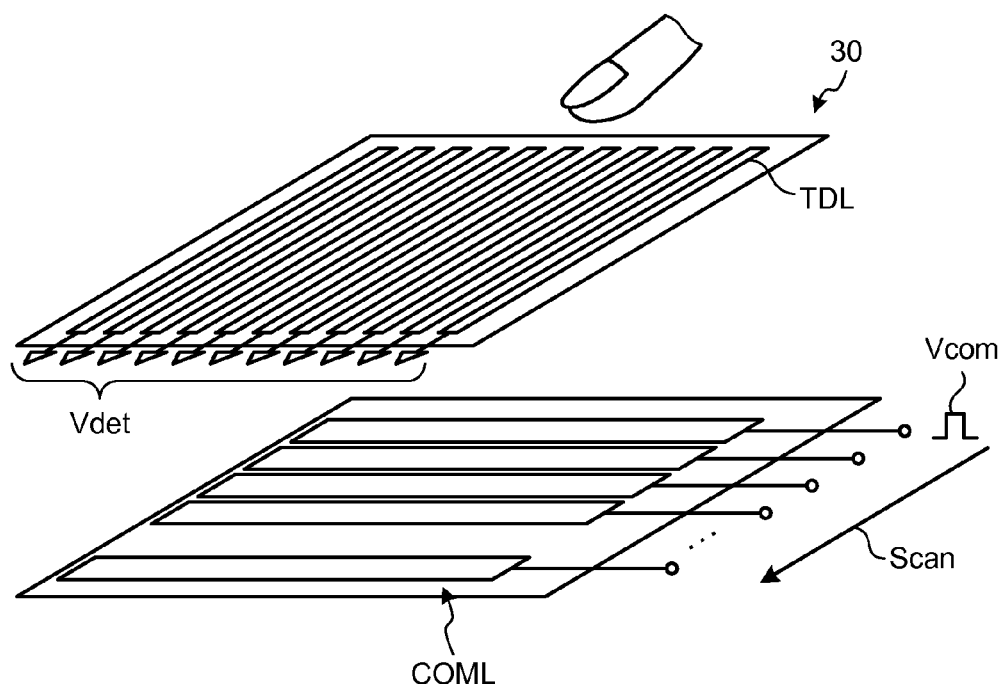
FIG. 11 is a perspective view illustrating a configuration example of drive electrodes and touch detection electrodes of the display unit with the touch detection function according to the embodiment.

The drive electrode COML according to the embodiment functions as a drive electrode of the liquid crystal display unit 20, and also as a drive electrode of the touch detection device 30. FIG. 11 is a perspective view illustrating a configuration example of the drive electrodes and the touch detection electrodes of the display unit with the touch detection function according to the embodiment. As illustrated in FIG. 9, the drive electrodes COML illustrated in FIG. 11 face the pixel electrodes 22 in the direction orthogonal to the surface of the TFT substrate 21. The touch detection device 30 includes the drive electrodes COML provided at the pixel substrate 2 and the touch detection electrodes TDL provided at the counter substrate 3. The touch detection electrodes TDL include stripe-like electrode patterns extending in the direction intersecting the extending direction of the electrode patterns of the drive electrodes COML. The touch detection electrodes TDL face the drive electrodes COML in the direction orthogonal to the surface of the TFT substrate 21. Each of the electrode patterns of the touch detection electrodes TDL is coupled to an input terminal of the touch detection signal amplifier 42 of the touch detection unit 40. The electrode patterns of the drive electrodes COML and the touch detection electrodes TDL generate intersecting each other electrostatic capacitance at intersecting portions therebetween. The touch detection electrodes TDL and/or the drive electrodes COML (drive electrode blocks) are not limited to have a shape divided into a plurality of stripes. For example, the touch detection electrodes TDL and/or the drive electrodes COML (drive electrode blocks) may have a comb shape. Otherwise, in the touch detection electrodes TDL and/or the drive electrodes COML (drive electrode blocks), a plurality of patterns only need to be separated from each other. For example, the slits separating the drive electrodes COML from each other may have a straight-line shape or a curved-line shape.

When the touch detection device 30 performs the touch detection operation, this configuration causes the drive electrode driver 14 to perform driving so as to perform line-sequential scanning of the drive electrode blocks in a time-division manner. This leads to sequential selection of one detection block of the drive electrodes COML in a scan direction Scan. The touch detection device 30 outputs the touch detection signal Vdet from each of the touch detection electrodes TDL. The touch detection device 30 is configured to perform the touch detection of one detection block in this manner. This means that the drive electrode block corresponds to the drive electrode E1 whereas the touch detection electrode TDL corresponds to the touch detection electrode E2 in the above-described basic principle of touch detection, and the touch detection device 30 is configured to detect the touch according to the basic principle. As illustrated in FIG. 11, the electrode patterns intersecting each other constitute an electrostatic capacitance type touch sensor in a matrix form. This also enables detection of a position where the external proximity object is in contact therewith or in proximity thereof by scanning the entire touch detection surface of the touch detection device 30.

The liquid crystal layer 6 modulates light passing therethrough according to the state of an electric field, and includes liquid crystals of a horizontal electric field mode, such as a fringe field switching (FFS) mode or an in-plane switching (IPS) mode. An orientation film may be interposed between the liquid crystal layer 6 and the pixel substrate 2, and between the liquid crystal layer 6 and the counter substrate 3, which are illustrated in FIG. 9.

The counter substrate 3 includes a glass substrate 31 and a color filter 32 formed at one surface of the glass substrate 31. The touch detection electrodes TDL serving as detection electrodes of the touch detection device 30 are formed at the other surface of the glass substrate 31, and a polarizing plate 35 is further disposed above the touch detection electrodes TDL.

In the color filter 32 illustrated in FIG. 9, for example, color regions colored in three colors of red (R), green (G), and blue (B) are periodically arranged, and these color regions 32R, 32G, and 32B (refer to FIG. 10) of the three colors of R, G, and B correspond to the above-described respective sub-pixels SPix illustrated in FIG. 10. The color regions 32R, 32G, and 32B constitute each of the pixels Pix as a set. The pixels Pix are arranged in a matrix along directions parallel to the scan lines GCL and the signal lines SGL, and form a display area Ad to be described later. The color filter 32 faces the liquid crystal layer 6 in the direction orthogonal to the TFT substrate 21. Thus, the sub-pixels SPix can perform monochromatic display. The color filter 32 may have a combination of other colors as long as being colored in different colors from each other. The color filter 32 is not indispensable. Thus, an area not covered with the color filter 32 (i.e., uncolored sub-pixels SPix) may exist.

The glass substrate 31 corresponds to a specific example of a "substrate" in the present disclosure. The color regions 32R, 32G, and 32B correspond to a specific example of "color regions" in the present disclosure. The pixel Pix corresponds to a specific example of a "pixel" in the present disclosure. The display area Ad corresponds to a specific example of a "display area" in the present disclosure. The touch detection electrode TDL corresponds to a specific example of a "touch detection electrode" in the present disclosure. The drive electrode COML corresponds to a specific example of a "drive electrode" in the present disclosure.

1-2. Operations and Actions

Subsequently, a description will be made of operations and actions of the display device with the touch detection function 1 of the embodiment.

The drive signals Vcom can affect each other because the drive electrode COML functions as a common drive electrode of the liquid crystal display unit 20 and also as a drive electrode of the touch detection device 30. For this reason, the drive signals Vcom are applied to the drive electrodes COML separately in a display period B in which the display operation is performed, and in a touch detection period A in which the touch detection operation is performed. The drive electrode driver 14 applies the drive signal Vcom as a display drive signal in the display period B in which the display operation is performed. The drive electrode driver 14 applies the drive signal Vcom as a touch drive signal in the touch detection period A in which the touch detection operation is performed. The description below will describe the drive signal Vcom serving as the display drive signal as a display drive signal Vcomd, and the drive signal Vcom serving as the touch drive signal as the touch drive signal Vcomt.

Overall Operation Overview

Based on the externally supplied video signal Vdisp, the control unit 11 supplies the control signal to each of the gate driver 12, the source driver 13, the drive electrode driver 14, and the touch detection unit 40 so as to operate in synchronization with each other. In the display period B, the gate driver 12 supplies the scan signals Vscan to the liquid crystal display unit 20, and thus sequentially selects one horizontal line to be display-driven. The source driver 13 supplies the pixel signals Vpix to the respective pixels Pix constituting the horizontal line selected by the gate driver 12 in the display period B.

In the display period B, the drive electrode driver 14 applies the display drive signals Vcomd to a drive electrode block related to the horizontal line. In the touch detection period A, the drive electrode driver 14 sequentially applies the touch drive signal Vcomt to a drive electrode block related to the touch detection operation, and thus sequentially selects one detection block. In the display period B, the display unit with the touch detection function 10 performs the display operation based on the signals supplied from the gate driver 12, the source driver 13, and the drive electrode driver 14. In the touch detection period A, the display unit with the touch detection function 10 performs the touch detection operation based on the signal supplied from the drive electrode driver 14, and outputs the touch detection signal Vdet from the touch detection electrode TDL. The touch detection signal amplifier 42 amplifies and then outputs the touch detection signal Vdet. The A/D converter 43 converts the analog signal output from the touch detection signal amplifier 42 into the digital signal at a timing synchronized with the touch drive signal Vcomt. Based on the output signal of the A/D converter 43, the signal processing unit 44 detects existence of a touch to the touch detection device 30. The detection of the touch by the signal processing unit 44 leads the coordinate extraction unit 45 to obtain the touch panel coordinates of the touch.

Detailed Operation

Figure 12:
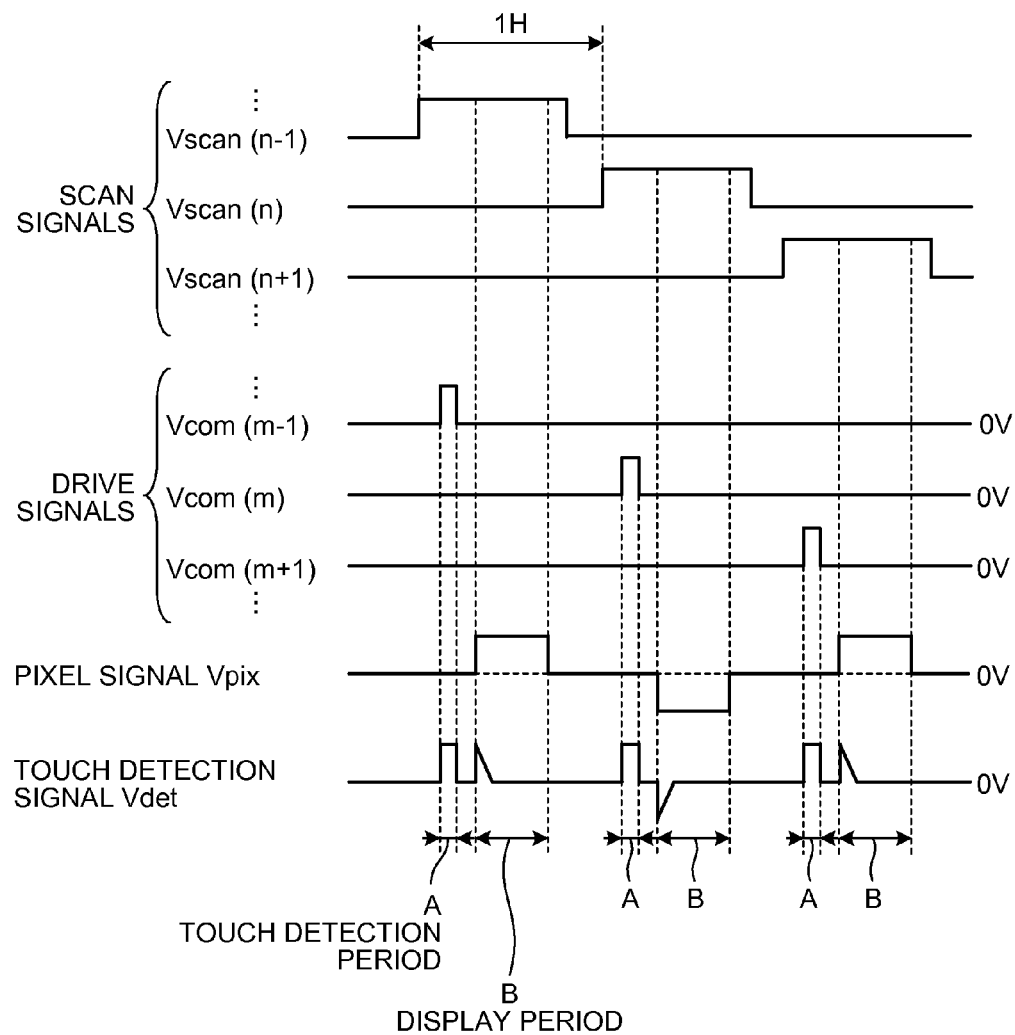
FIG. 12 is a timing waveform diagram illustrating an operation example of the display device with the touch detection function according to the embodiment.

A detailed operation of the display device with the touch detection function 1 will be described below. FIG. 12 is a timing waveform diagram illustrating an operation example of the display device with the touch detection function according to the embodiment. As illustrated in FIG. 12, the liquid crystal display unit 20 sequentially scan on each of horizontal lines the adjacent scan lines GCL of (n−1)th, nth, and (n+1)th rows among the scan lines GCL based on the scan signals Vscan supplied from the gate driver 12, and thus performs the display. In a similar manner, based on the control signal supplied from the control unit 11, the drive electrode driver 14 supplies the drive signal Vcom to the adjacent drive electrodes COML of (m−1)th, mth, and (m+1)th columns among the drive electrodes COML of the display unit with the touch detection function 10.

In this manner, the display device with the touch detection function 1 performs the touch detection operation (in the touch detection period A) and the display operation (in the display period B) in a time-division manner at intervals of one horizontal display period (1H). In the touch detection operation, the scanning of the touch detection is performed by selecting a different drive electrode COML and applying thereto the drive signal Vcom at intervals of one horizontal display period 1H. The operation will be described below in detail.

First, the gate driver 12 applies the scan signal Vscan to the scan line GCL of the (n−1)th row, and thus the level of a scan signal Vscan(n−1) changes from a low level to a high level. This starts one horizontal display period 1H.

Then, in the touch detection period A, the drive electrode driver 14 applies the drive signal Vcom to the drive electrode COML of the (m−1)th column, and thus the level of a drive signal Vcom(m−1) changes from a low level to a high level. The drive signal Vcom(m−1) is transmitted to the touch detection electrode TDL via the electrostatic capacitance, and thus the touch detection signal Vdet changes. Then, a change in the level of the drive signal Vcom(m−1) from the high level to the low level changes the touch detection signal Vdet in the same manner. The waveform of the touch detection signal Vdet in the touch detection period A corresponds to the touch detection signal Vdet in the above-described basic principle of touch detection. The A/D converter 43 performs the touch detection by A/D-converting the touch detection signal Vdet in the touch detection period A. This is how the display device with the touch detection function 1 performs the touch detection for one detection line.

Then, in the display period B, the source driver 13 applies the pixel signals Vpix to the signal lines SGL to perform display for one horizontal line. As illustrated in FIG. 12, the changes in the pixel signals Vpix can be transmitted to the touch detection electrode TDL via parasitic capacitance so as to change the touch detection signal Vdet. However, in the display period B, keeping the A/D converter 43 from performing the A/D conversion can suppress the influence of the changes in the pixel signals Vpix on the touch detection. After the source driver 13 finishes supplying the pixel signals Vpix, the gate driver 12 changes the level of the scan signal Vscan(n−1) of the scan line GCL of the (n−1)th row from the high level to the low level, and thus the one horizontal display period finishes.

Then, the gate driver 12 applies the scan signal Vscan to the scan line GCL of the nth row that is different from the previous one, and thus the level of a scan signal Vscan(n) changes from a low level to a high level. This starts the next one horizontal display period.

In the next touch detection period A, the drive electrode driver 14 applies the drive signal Vcom to the drive electrode COML of the mth column that is different from the previous one. Then, the A/D converter 43 A/D-converts a change in the touch detection signal Vdet, and thus the touch detection for this detection line is performed.

Then, in the display period B, the source driver 13 applies the pixel signals Vpix to the signal lines SGL to perform display for one horizontal line. The drive electrode driver 14 applies the display drive signal Vcomd as a common potential to the drive electrode COML. The potential of the display drive signal Vcomd is, for example, a low-level potential of the touch drive signal Vcomt in the touch detection period A. The display device with the touch detection function 1 of the embodiment performs dot inversion driving, so that the pixel signals Vpix applied by the source driver 13 have a polarity opposite to that in the previous horizontal display period. After this display period B finishes, this horizontal display period 1H finishes.

From then on, the display device with the touch detection function 1 repeats the above-described operation to perform the display operation by scanning the entire display surface and also to perform the touch detection operation by scanning the entire touch detection surface.

In one horizontal display period (1H), the display device with the touch detection function 1 performs the touch detection operation during the touch detection period A and the display operation during the display period B. Performing the touch detection operation and the display operation in separate periods in this manner allows the display device with the touch detection function 1 to perform both the touch detection operation and the display operation in the same horizontal display period and to suppress the influence of the display operation on the touch detection.

Arrangement of Touch Detection Electrodes

Figure 13:
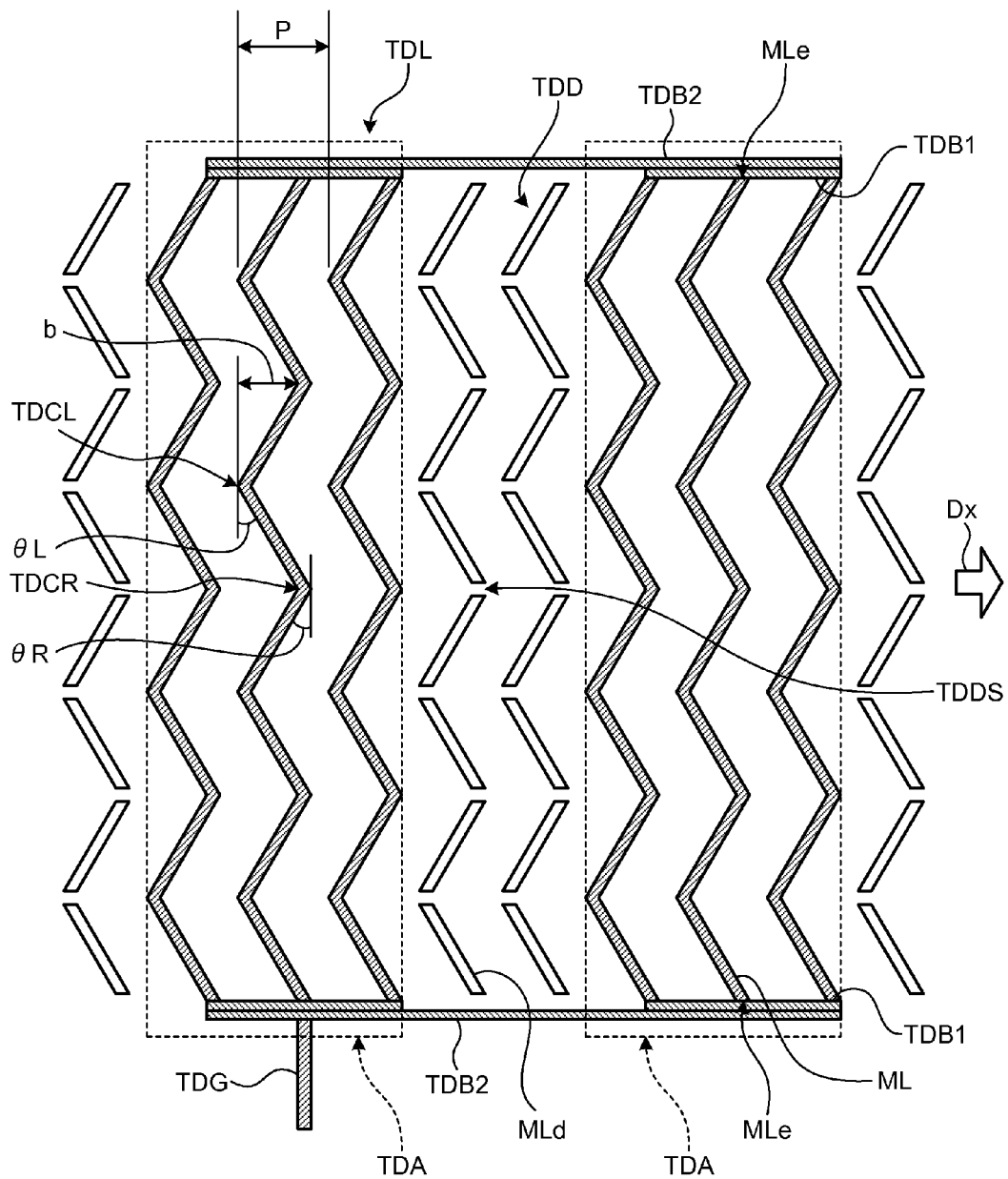
FIG. 13 is a schematic diagram illustrating an arrangement of the touch detection electrodes according to the embodiment.
Figure 14:
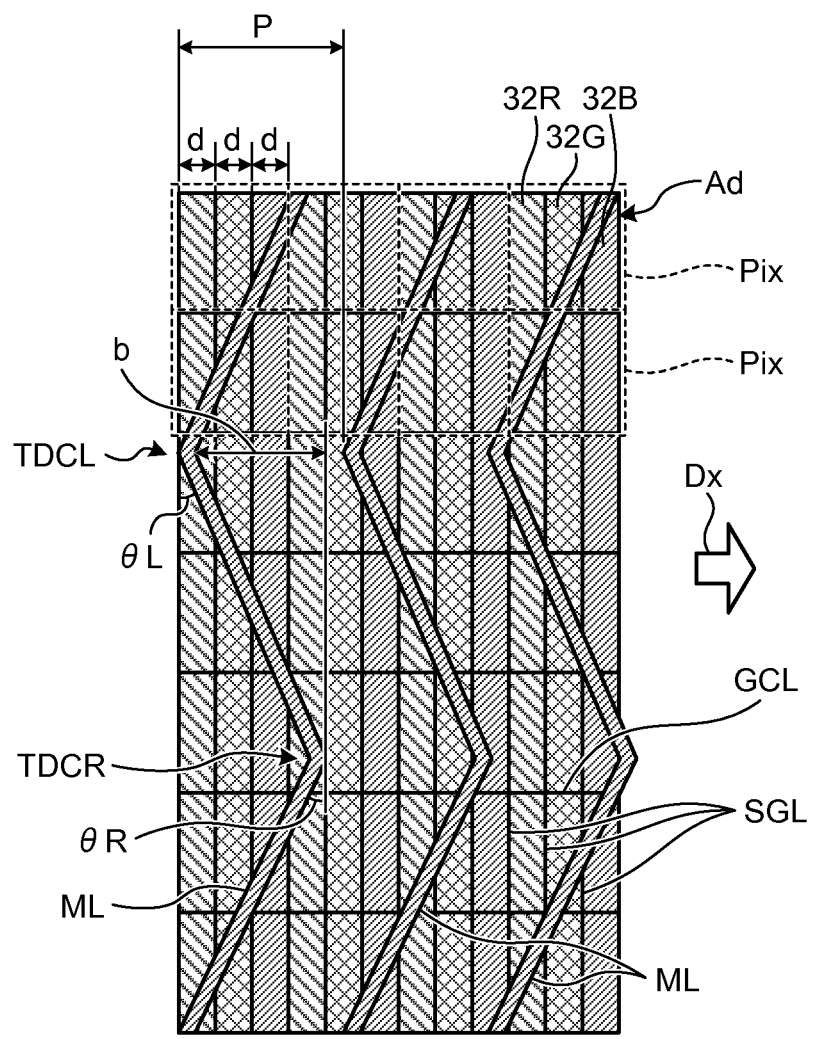
FIG. 14 is a schematic diagram for explaining a relation between each of the touch detection electrodes according to the embodiment and color regions.

FIG. 13 is a schematic diagram illustrating an arrangement of the touch detection electrodes TDL according to the embodiment. FIG. 14 is a schematic diagram for explaining a relation between the touch detection electrode TDL according to the embodiment and the color regions 32R, 32G, and 32B.

As illustrated in FIG. 13, when viewed down as a whole, the touch detection electrode TDL according to the embodiment includes a plurality of conductive thin wires ML extending in the same direction as a direction of extension of color regions of the same color which will be described later, in a plane parallel to the counter substrate 3. For example, all of the conductive thin wires ML according to the embodiment have the same shape as each other. The ends of MLe of the conductive thin wires ML are coupled with each other via first conductive portions TDB1, and the conductive thin wires ML belong to a detection area TDA. In the detection area TDA, the conductive thin wires ML are conductive with each other and extend at a certain interval between each other. The interval between the adjacent conductive thin wires ML in a color region orthogonal direction Dx is represented as a conductive thin wire interval P. For example, the conductive thin wire interval P according to the embodiment is constant. The conductive thin wires ML according to the embodiment extend in the direction of a straight line connecting one of the ends MLe to the other of the ends MLe in each one of the conductive thin wires ML. The conductive thin wires ML extend in the longitudinal direction of a shape occupied by each one of the conductive thin wires ML.

More than one of the detection areas TDA extends with a certain space between each other. The first conductive portions TDB1 of the detection areas TDA are coupled to be conductive with each other via a second conductive portion TDB2. The second conductive portion TDB2 is coupled to the touch detection unit 40 illustrated in FIG. 1 via detection wiring TDG. The first conductive portions TDB1 and the second conductive portions TDB2 are formed of the same material as that of the conductive thin wires ML. The above-described configuration can reduce the number of conductive thin wires ML, and causes the touch detection to be performed by a plurality of metal wires ML for a certain area so as to be able to reduce the resistance during the touch detection.

The conductive thin wire ML includes a portion at which the conductive thin wire ML extends in the direction at an angle $\theta L$ with respect to the direction of extension of the color regions which will be described later. The conductive thin wire ML also includes a portion at which the conductive thin wire ML extends in the direction at an angle $\theta R$ with respect to the direction of extension of the color regions which will be described later. For example, the angle $\theta L$ is equal to the angle $\theta R$ according to the embodiment. The conductive thin wire ML forms a zigzag line or a wavy line bent at bent portions TDCL and TDCR. The length of an offset in the color region orthogonal direction Dx from one of the bent portions TDCL to one of the bent portions TDCR next to the bent portion TDCL in each one of the conductive thin wires ML is represented as an inter-bent-portion length b. For example, the inter-bent-portion length b according to the embodiment is constant. The conductive thin wire ML preferably has a width which is in a range of 3 μm to 10 μm. This is because the width of the conductive thin wire ML of 10 μm or smaller reduces an area covering an aperture of the display area Ad through which light transmission is not suppressed by a black matrix or by the scan lines GCL and the signal lines SGL, and thus reduces the possibility of reducing an aperture ratio. This is also because the width of the conductive thin wire ML of 3 μm or larger stabilizes the shape thereof, and thus reduces the possibility of breaking thereof.

The conductive thin wire ML of the touch detection electrode TDL is of an electrically conductive metal material, and is formed of a metal material, such as aluminum (Al), copper (Cu), silver (Ag), molybdenum (Mo), chromium (Cr), tungsten (W), or an alloy of these materials. Alternatively, the conductive thin wire ML of the touch detection electrode TDL is formed of an oxide (metal oxide) of aluminum (Al), copper (Cu), silver (Ag), molybdenum (Mo), chromium (Cr), or tungsten (W), and has electric conductivity. The conductive thin wire ML may be a patterned laminated body that has one or more layers of the above-described metal material and/or the above-described metal oxide. The conductive thin wire ML may be a patterned laminated body that has one or more layers of the metal material or the metal oxide described above, and/or a translucent conductive oxide such as ITO as a material of translucent electrodes. The conductive thin wire ML has a lower resistance than that of the translucent conductive oxide such as ITO as a material of translucent electrodes. The material of the conductive thin wire ML has a lower transmittance value than that of a material of ITO having the same film thickness. For example, the material of the conductive thin wire ML may have a transmittance value of 10% or less.

As illustrated in FIG. 13, the detection areas TDA are arranged with a certain space between each other. Areas in which the conductive thin wires ML of the touch detection electrode TDL are arranged and areas in which the conductive thin wires ML of the touch detection electrode TDL are not arranged have different levels of light-shielding effect from each other. This can cause the touch detection electrode TDL to be easily visible. Therefore, dummy electrodes TDD that are not connected to the detection wiring TDG are each arranged between the adjacent detection areas TDA at the counter substrate 3. The dummy electrodes TDD are formed of the same material as that of the conductive thin wires ML of the touch detection electrode TDL. The conductive thin wires MLd of the dummy electrodes TDD may be formed of other material, and only needs to have a level of the light-shielding effect comparable with that of the touch detection electrode TDL.

Each of the dummy electrodes TDD illustrated in FIG. 13 includes a plurality of such conductive thin wires MLd extending in the plane parallel to the counter substrate 3. The conductive thin wires MLd are the conductive thin wires ML not coupled to the first conductive portions TDB1. The conductive thin wires MLd are arranged so as to have the conductive thin wire interval P between the adjacent conductive thin wires MLd. This reduces the difference in the level of the light-shielding effect between the areas arranged with the touch detection electrodes TDL and the areas not arranged therewith, and thus can reduce the possibility of the touch detection electrode TDL being seen.

Each of the conductive thin wires MLd includes split portions TDDS that are slits not containing the same material as that of the conductive thin wire ML in positions corresponding to the bent portions TDCL and TDCR lying in the conductive thin wire ML. This follows that the split portions TDDS prevent electrical conduction between portions forming different angles with respect to the direction of extension of the conductive thin wires MLd, and thus generate a difference in capacitance from the touch detection electrode. This can reduce an influence of the dummy electrode TDD on the absolute value $|\Delta V|$ illustrated in FIG. 6 when a finger approaches both the touch detection electrode TDL and the dummy electrode TDD during the touch detection. In this manner, the split portions TDDS split the dummy electrode TDD into portions having a smaller area than that of the conductive thin wire ML of the touch detection electrode TDL, and thereby can reduce the influence of the dummy electrode TDD on accuracy of the touch detection. The split portions TDDS may lie in some of the positions corresponding to the bent portions TDCL and TDCR lying in the conductive thin wire ML. The split portions TDDS may lie, for example, only in positions corresponding to the bent portions TDCL lying in the conductive thin wire ML.

Using FIG. 14, a description will be made below of the relation between the conductive thin wires ML and the color regions 32R, 32G, and 32B. FIG. 14 is an enlarged diagram of a portion of the conductive thin wires ML illustrated in FIG. 13. As described above, the display area Ad includes the pixels Pix, each of which includes as a set the color regions 32R, 32G, and 32B corresponding to the respective sub-pixels SPix. The pixels Pix are arranged in a matrix along the directions parallel to the scan lines GCL and the signal lines SGL. The color regions of the same color extend so as to form a column parallel to the signal lines SGL. The color region orthogonal direction Dx is a direction orthogonal to the direction of extension of the color regions of the same color. The width in the color region orthogonal direction Dx of each of the color regions 32R, 32G, and 32B is represented as a color region width d.

The conductive thin wires ML overlap a surface of the display area Ad in a direction orthogonal thereto. The conductive thin wires ML are arranged so that the conductive thin wire interval P is smaller than the sum of the inter-bent-portion length b and the color region width d. In other words, the conductive thin wires ML are arranged so as to satisfy Formula (1) below.

$$P<b+d \tag{1}$$

In addition, the conductive thin wire interval P is preferably equal to or larger than the inter-bent-portion length b. In other words, the conductive thin wires ML preferably further satisfy Formula (2) below.

$$b \leq P \tag{2}$$

Moreover, the conductive thin wire interval P is specifically preferably equal to or smaller than 160 μm. In other words, the conductive thin wires ML preferably further satisfy Formula (3) below. This is because the conductive thin wire interval P of 160 μm or smaller makes the conductive thin wires ML less likely to be resolved with resolving power of human eyes, and thus less likely to be seen.

$$P \leq 160 \text{ μm} \tag{3}$$

1-3. Operational Advantages

As described above, the pixels Pix are arranged in a matrix along the directions parallel to the scan lines GCL and the signal lines SGL. If the scan lines GCL and the signal lines SGL are covered with the black matrix, the black matrix keeps light from transmitting. If the scan lines GCL and the signal lines SGL are not covered with the black matrix, the scan lines GCL and the signal lines SGL keep light from transmitting. In the embodiment, a periodic pattern of a plurality of straight lines along the direction parallel to the scan lines GCL is likely to appear in the display area Ad. A periodic pattern of a plurality of straight lines along the direction parallel to the signal lines SGL is likely to appear in the display area Ad. Therefore, when the touch detection electrodes TDL overlap the surface of the display area Ad in the direction orthogonal thereto, the patterns appearing in the display area Ad interfere the touch detection electrodes TDL to form a light-dark pattern, and thereby a moire pattern can be seen. The moire pattern can more probably be seen particularly when the conductive thin wires ML are shaped like straight lines parallel to the scan lines GCL or the signal lines SGL. When the conductive thin wires ML shield light of a certain color region among the color regions 32R, 32G, and 32B, a difference in luminance is generated between the color regions, so that the moire pattern can be seen.

As illustrated in FIG. 14, the conductive thin wires ML according to the embodiment extend in the same direction as the direction of extension of the color regions, when viewed down as a whole. The conductive thin wires ML include portions forming an angle with respect to the direction of extension of the color regions, when viewed partially. The direction of extension of the color regions corresponds to the direction parallel to the signal lines SGL. The conductive thin wires ML form the zigzag lines or wavy lines, and include the portions forming an angle with respect to the scan lines GCL or the signal lines SGL. This allows the display device with the touch detection function 1 according to the embodiment to reduce the possibility of the moire pattern being seen more than in the case in which the conductive thin wires ML are shaped like straight lines parallel to the scan lines GCL or the signal lines SGL.

As illustrated in FIG. 14, each of the conductive thin wires ML according to the embodiment includes portions overlapping all of the columns of colors formed by the color regions 32R, 32G, and 32B in the direction orthogonal to the surface of the display area Ad. This makes the conductive thin wires ML less likely to shield the light of a certain color region among the color regions 32R, 32G, and 32B. This, in turn, makes the display device with the touch detection function 1 according to the embodiment less likely to generate the difference in the luminance between the color regions, and thus reduces the possibility of the moire pattern being seen.

All of the conductive thin wires ML according to the embodiment have the same shape, and are arranged so as to satisfy Formula (1) given above. This makes the conductive thin wires ML regularly arranged, and thus makes each of the conductive thin wires ML less easy to be seen. This, in turn, can make the conductive thin wires ML of the display device with the touch detection function 1 according to the embodiment less likely to be seen by a person. The satisfaction of Formula (1) given above inevitably makes each of the conductive thin wires ML include the portions overlapping all of the columns of colors formed by the color regions 32R, 32G, and 32B in the direction orthogonal to the surface of the display area Ad. This makes the conductive thin wires ML less likely to shield the light of a certain color region among the color regions 32R, 32G, and 32B. This, in turn, makes the display device with the touch detection function 1 according to the embodiment less likely to generate the difference in the luminance between the color regions, and thus reduces the possibility of the moire pattern being seen.

In addition, the satisfaction of Formula (2) given above maintains the interval between the adjacent conductive thin wires ML at a certain value or larger. This reduces the area by which the conductive thin wires ML cover the aperture of the display area Ad through which the light transmission is not suppressed by the black matrix or by the scan lines GCL and the signal lines SGL. This, in turn, can further reduce the possibility of reducing the aperture ratio of the display device with the touch detection function 1 according to the embodiment.

The angles θR and θL are preferably in a range of 30 degrees to 40 degrees, or 50 degrees to 60 degrees. This makes the angles of the conductive thin wires ML equal to or larger than a certain degree with respect to the scan lines GCL and the signal lines SGL, and thereby helps the period of the light-dark pattern to be small enough so that the person cannot see the pattern. This can reduce the possibility of the moire pattern being seen.

1-4. First Modification of Embodiment

Figure 15:
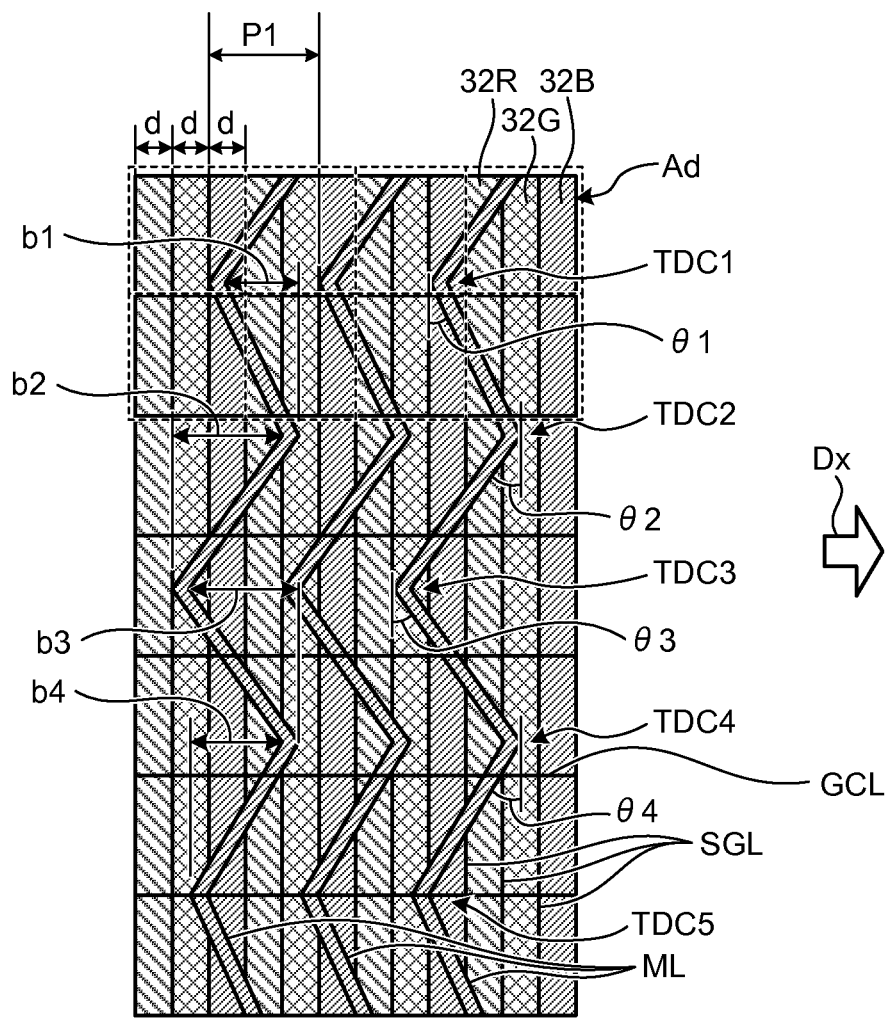
FIG. 15 is a schematic diagram for explaining a relation between a touch detection electrode according to a first modification of the embodiment and the color regions.

FIG. 15 is a schematic diagram for explaining a relation between a touch detection electrode TDL according to a first modification of the embodiment and the color regions 32R, 32G, and 32B. For example, all of a plurality of conductive thin wires ML according to the first modification of the embodiment have the same shape as each other. For example, a conductive thin wire interval P1 according to the first modification of the embodiment is constant.

The length of an offset in the color region orthogonal direction Dx from a bent portion TDC1 to a bent portion TDC2 next to the bent portion TDC1 in each one of the conductive thin wires ML is represented as an inter-bent-portion length b1. The direction of extension of a portion connecting the bent portion TDC1 to the bent portion TDC2 in the conductive thin wire ML forms an angle θ1 with respect to the direction of extension of the conductive thin wire ML.

The length of an offset in the color region orthogonal direction Dx from the bent portion TDC2 to a bent portion TDC3 next to the bent portion TDC2 in each one of the conductive thin wires ML is represented as an inter-bent-portion length b2. The direction of extension of a portion connecting the bent portion TDC2 to the bent portion TDC3 in the conductive thin wire ML forms an angle θ2 with respect to the direction of extension of the conductive thin wire ML.

The length of an offset in the color region orthogonal direction Dx from the bent portion TDC3 to a bent portion TDC4 next to the bent portion TDC3 in each one of the conductive thin wires ML is represented as an inter-bent-portion length b3. The direction of extension of a portion connecting the bent portion TDC3 to the bent portion TDC4 in the conductive thin wire ML forms an angle θ3 with respect to the direction of extension of the conductive thin wire ML.

The length of an offset in the color region orthogonal direction Dx from the bent portion TDC4 to a bent portion TDC5 next to the bent portion TDC4 in each one of the conductive thin wires ML is represented as an inter-bent-portion length b4. The direction of extension of a portion connecting the bent portion TDC4 to the bent portion TDC5 in the conductive thin wire ML forms an angle θ4 with respect to the direction of extension of the conductive thin wire ML.

Among the inter-bent-portion lengths b1, b2, b3, and b4, the inter-bent-portion length b1 is the shortest; the inter-bent-portion length b4 is the second shortest to the inter-bent-portion length b1; and the inter-bent-portion lengths b2 and b3 are the longest.

When the inter-bent-portion lengths b1, b2, b3, and b4 are not equal lengths as described above, the conductive thin wires ML are arranged so that the conductive thin wire interval P1 is smaller than the sum of the inter-bent-portion length b1 (i.e., the smallest length of the inter-bent-portion lengths b1, b2, b3, and b4) and the color region width d. In other words, the conductive thin wires ML are arranged so as to satisfy Formula (4) below.

$$P1 < b1 + d \tag{4}$$

In addition, the conductive thin wire interval P1 is preferably equal to or larger than the inter-bent-portion length b1. In other words, the conductive thin wires ML preferably further satisfy Formula (5) below.

$$b1 \leq P1 \tag{5}$$

Moreover, the conductive thin wire interval P1 is specifically preferably equal to or smaller than 160 μm. In other words, the conductive thin wires ML preferably further satisfy Formula (6) below. This is because the conductive thin wire interval P of 160 μm or smaller makes the conductive thin wires ML less likely to be resolved with the resolving power of the human eyes, and thus less likely to be seen.

$$P1 \leq 160 \text{ μm} \tag{6}$$

1-5. Operational Advantages

As illustrated in FIG. 15, the conductive thin wires ML according to the first modification of the embodiment extend in the same direction as the direction of extension of the color regions, when viewed down as a whole. The conductive thin wires ML include portions forming an angle with respect to the direction of extension of the color regions, when viewed partially. The direction of extension of the color regions corresponds to the direction parallel to the signal lines SGL. The conductive thin wires ML form the zigzag lines or wavy lines, and include the portions forming an angle with respect to the scan lines GCL or the signal lines SGL. This allows the display device with the touch detection function 1 according to the embodiment to reduce the possibility of the moire pattern being seen more than in the case in which the conductive thin wires ML are shaped like straight lines parallel to the scan lines GCL or the signal lines SGL.

As illustrated in FIG. 15, each of the conductive thin wires ML according to the first modification of the embodiment includes portions overlapping all of the columns of colors formed by the color regions 32R, 32G, and 32B in the direction orthogonal to the surface of the display area Ad. This makes the conductive thin wires ML less likely to shield the light of a certain color region among the color regions 32R, 32G, and 32B. This, in turn, makes the display device with the touch detection function 1 according to the embodiment less likely to generate the difference in the luminance between the color regions, and thus reduces the possibility of the moire pattern being seen.

All of the conductive thin wires ML according to the first modification of the embodiment have the same shape, and are arranged so as to satisfy Formula (4) given above. This makes the conductive thin wires ML regularly arranged, and thus makes each of the conductive thin wires ML less easy to be seen. This, in turn, can make the conductive thin wires ML of the display device with the touch detection function 1 according to the first modification of the embodiment less likely to be seen by the person. The satisfaction of Formula (4) given above inevitably makes each of the conductive thin wires ML include the portions overlapping all of the columns formed of the color regions of the same color in the direction orthogonal to the surface of the display area Ad. This makes the conductive thin wires ML less likely to shield the light of a certain color region among the color regions 32R, 32G, and 32B. This, in turn, makes the display device with the touch detection function 1 according to the embodiment less likely to generate the difference in the luminance between the color regions, and thus reduces the possibility of the moire pattern being seen.

In addition, the satisfaction of Formula (5) given above maintains the interval between the adjacent conductive thin wires ML at a certain value or larger. This reduces the area by which the conductive thin wires ML cover the aperture of the display area Ad through which the light transmission is not suppressed by the black matrix or by the scan lines GCL and the signal lines SGL. This, in turn, can further reduce the possibility of reducing the aperture ratio of the display device with the touch detection function 1 according to the embodiment.

The angles θ1, θ2, θ3, and θ4 are in a range of preferably 30 degrees to 40 degrees, or 50 degrees to 60 degrees. This makes the angles of the conductive thin wires ML equal to or larger than a certain degree with respect to the scan lines GCL and the signal lines SGL, and thereby helps the period of the light-dark pattern to be small enough so that the person cannot see the pattern. This can reduce the possibility of the moire pattern being seen.

1-6. Second Modification of Embodiment

Figure 16:
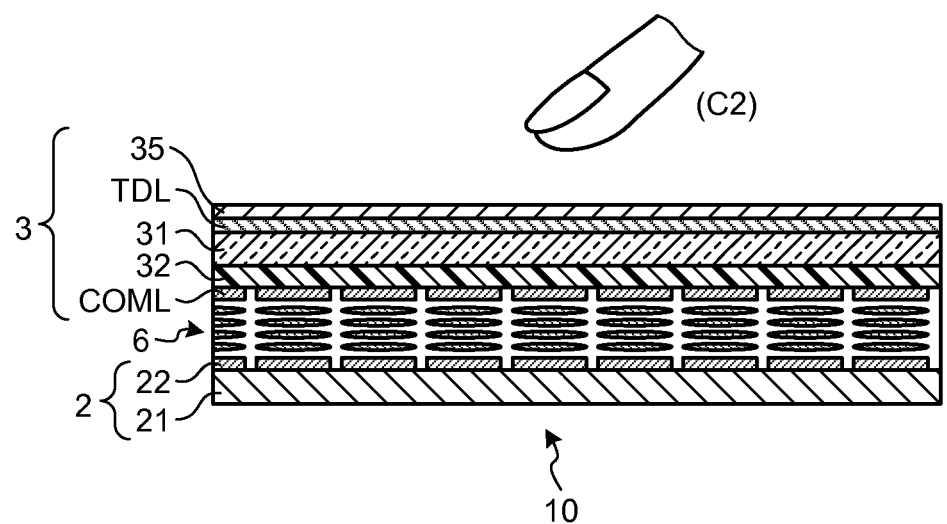
FIG. 16 is a cross-sectional view illustrating a schematic cross-sectional structure of a display unit with a touch detection function according to a second modification of the embodiment.

FIG. 16 is a cross-sectional view illustrating a schematic cross-sectional structure of a display unit with a touch detection function according to a second modification of the embodiment of the present disclosure. In the display device with the touch detection function 1 according to the embodiment and the modifications thereof described above, the liquid crystal display unit 20 using the liquid crystals of one of the various modes, such as the FFS mode and the IPS mode, can be integrated with the touch detection device 30 to provide the display unit with the touch detection function 10. A display unit with a touch detection function 10 according to the second modification of the embodiment illustrated in FIG. 16 may instead be provided by integrating the touch detection device with liquid crystals of one of various modes, such as a twisted nematic (TN) mode, a vertical alignment (VA) mode, and an electrically controlled birefringence (ECB) mode.

2. Application Examples

With reference to FIGS. 17 to 29, a description will be made below of application examples of the display device with the touch detection function 1 described in the embodiment and the modifications thereof. FIGS. 17 to 29 are diagrams each illustrating an example of an electronic apparatus to which the display device with the touch detection function or the display device according to the above-mentioned embodiment and the modifications thereof is applied. The display device with the touch detection function 1 or the display device according to the above-mentioned embodiment and the modifications thereof can be applied to electronic apparatuses in all fields, such as television devices, digital cameras, laptop computers, portable electronic apparatuses including mobile phones, and video cameras. In other words, the display device with the touch detection function 1 or the display device according to the above-described embodiment and the modifications thereof can be applied to electronic apparatuses in all fields that display externally received video signals or internally generated video signals as images or video pictures.

Application Example 1

Figure 17:
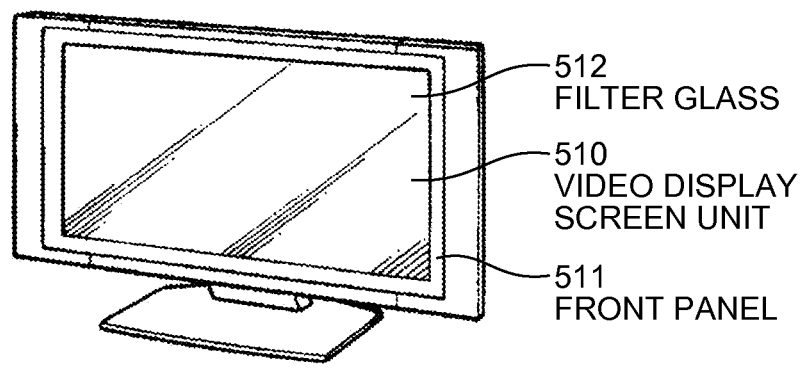
FIG. 17 is a diagram illustrating an example of an electronic apparatus to which the display device with the touch detection function or the display device according to the embodiment and modifications is applied.

The electronic apparatus illustrated in FIG. 17 is a television device to which the display device with the touch detection function 1 or the display device according to the embodiment and the modifications thereof is applied. This television device includes, for example, a video display screen unit 510 that includes a front panel 511 and a filter glass 512. The video display screen unit 510 corresponds to the display device with the touch detection function 1 or the display device according to the embodiment and the modifications thereof.

Application Example 2

Figure 18:
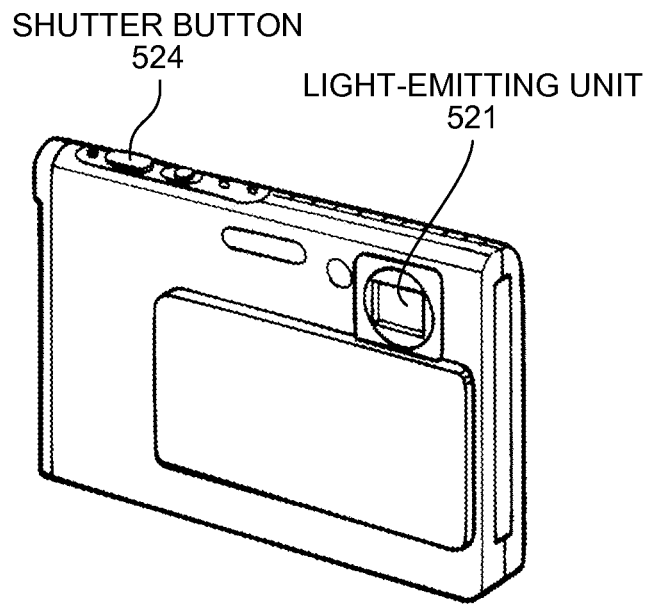
FIG. 18 is a diagram illustrating an example of an electronic apparatus to which the display device with the touch detection function or the display device according to the embodiment and modifications is applied.
Figure 19:
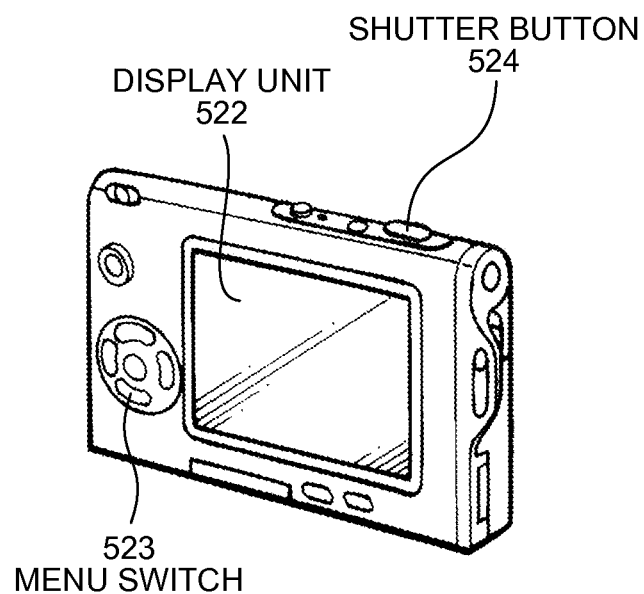
FIG. 19 is a diagram illustrating the example of the electronic apparatus to which the display device with the touch detection function or the display device according to the embodiment and modifications is applied.

The electronic apparatus illustrated in FIGS. 18 and 19 is a digital camera to which the display device with the touch detection function 1 or the display device according to the embodiment and the modifications thereof is applied. This digital camera includes, for example, a light-emitting unit 521 for flash, a display unit 522, a menu switch 523, and a shutter button 524. The display unit 522 corresponds to the display device with the touch detection function 1 or the display device according to the embodiment and the modifications thereof.

Application Example 3

Figure 20:
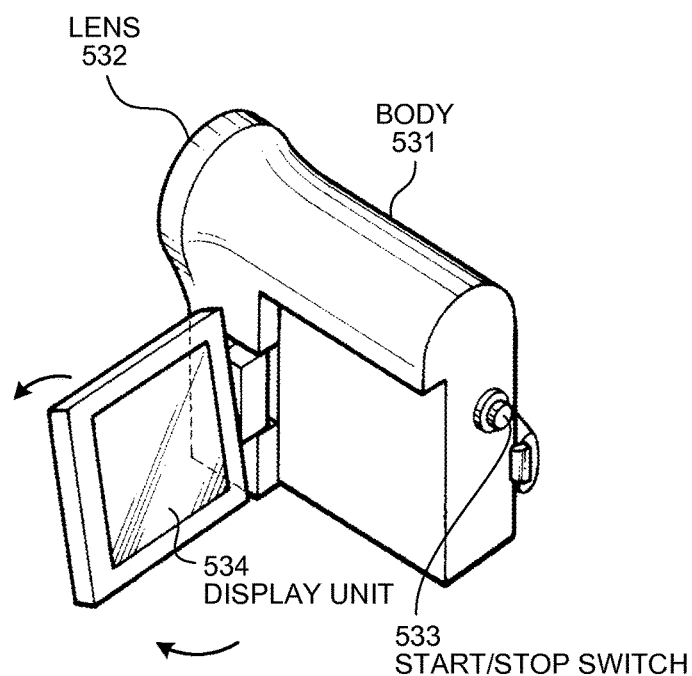
FIG. 20 is a diagram illustrating an example of an electronic apparatus to which the display device with the touch detection function or the display device according to the embodiment and modifications is applied.

The electronic apparatus illustrated in FIG. 20 represents an external appearance of a video camera to which the display device with the touch detection function 1 or the display device according to the embodiment and the modifications thereof is applied. This video camera includes, for example, a body 531, a lens 532 for photographing a subject provided on the front side face of the body 531, and a start/stop switch 533 for photographing, and a display unit 534. The display unit 534 corresponds to the display device with the touch detection function 1 or the display device according to the embodiment and the modifications thereof.

Application Example 4

Figure 21:
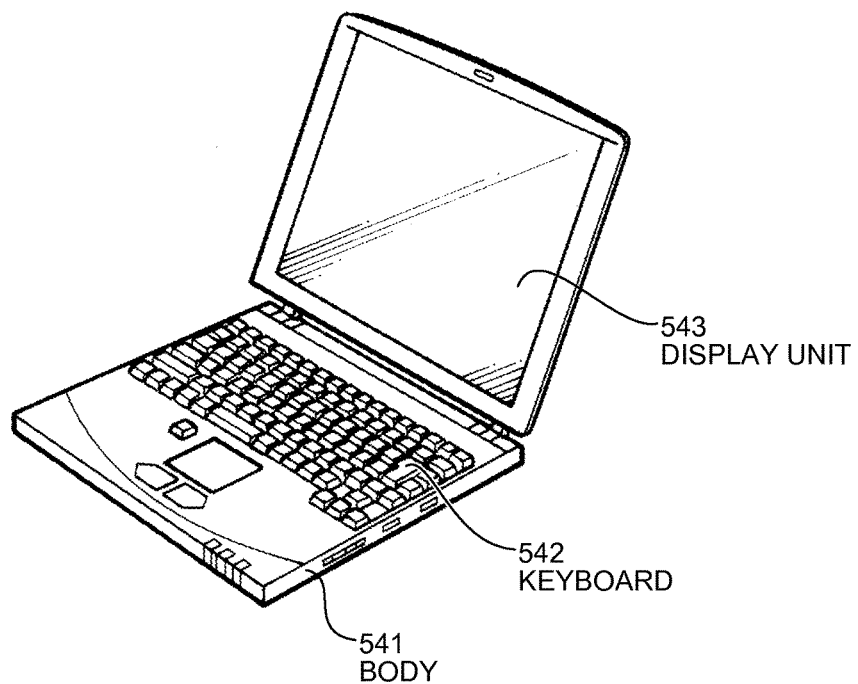
FIG. 21 is a diagram illustrating an example of an electronic apparatus to which the display device with the touch detection function or the display device according to the embodiment and modifications is applied.
Figure 22:
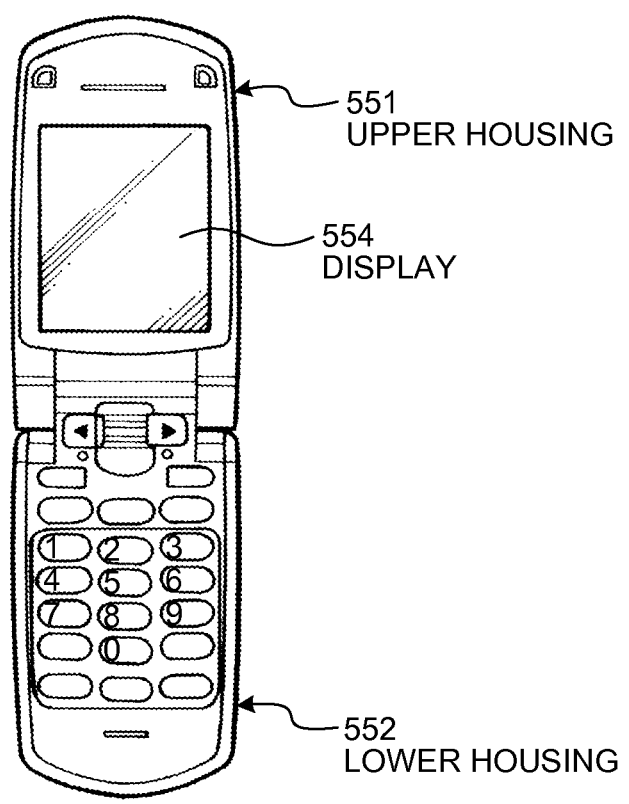
FIG. 22 is a diagram illustrating an example of an electronic apparatus to which the display device with the touch detection function or the display device according to the embodiment and modifications is applied.
Figure 23:
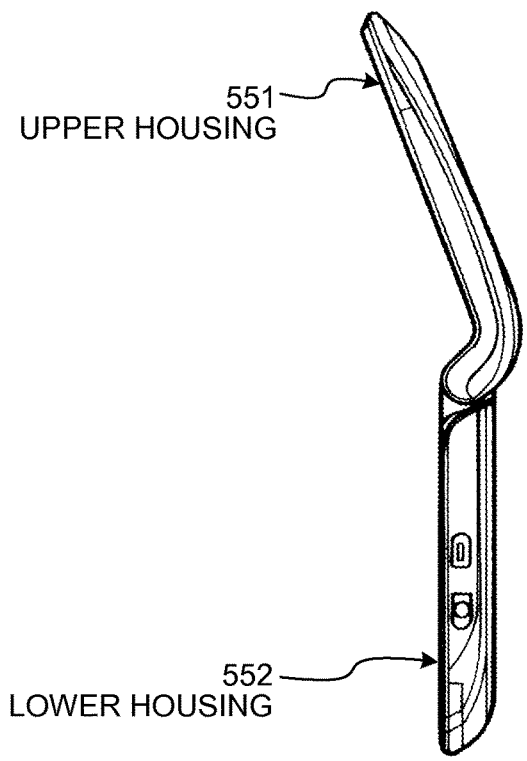
FIG. 23 is a diagram illustrating the example of the electronic apparatus to which the display device with the touch detection function or the display device according to the embodiment and modifications is applied.
Figure 24:
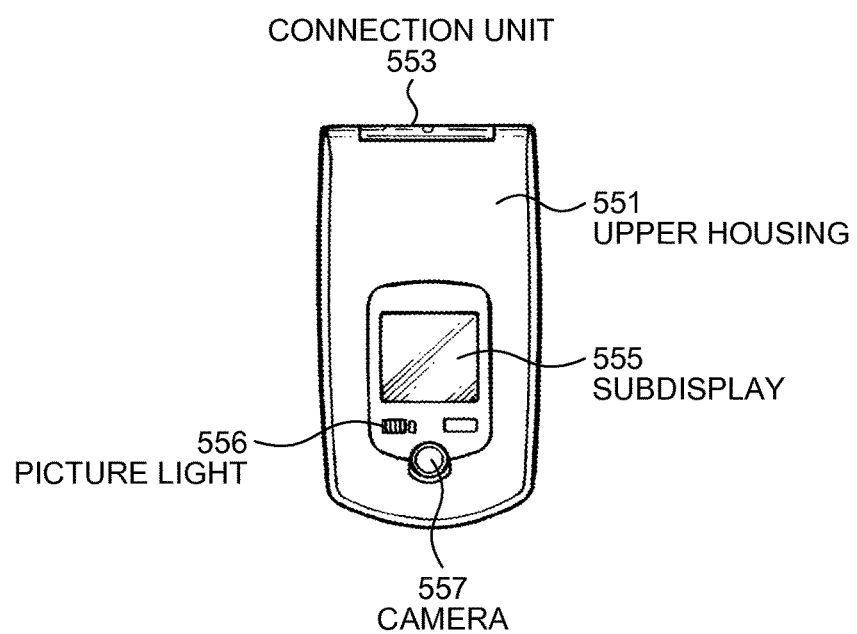
FIG. 24 is a diagram illustrating the example of the electronic apparatus to which the display device with the touch detection function or the display device according to the embodiment and modifications is applied.
Figure 25:
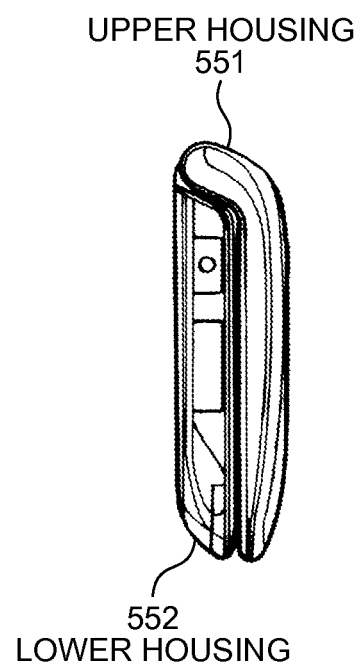
FIG. 25 is a diagram illustrating the example of the electronic apparatus to which the display device with the touch detection function or the display device according to the embodiment and modifications is applied.
Figure 26:
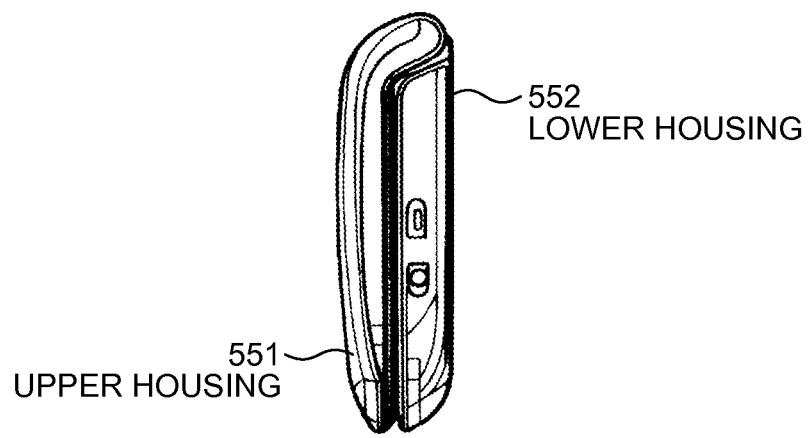
FIG. 26 is a diagram illustrating the example of the electronic apparatus to which the display device with the touch detection function or the display device according to the embodiment and modifications is applied.
Figure 27:
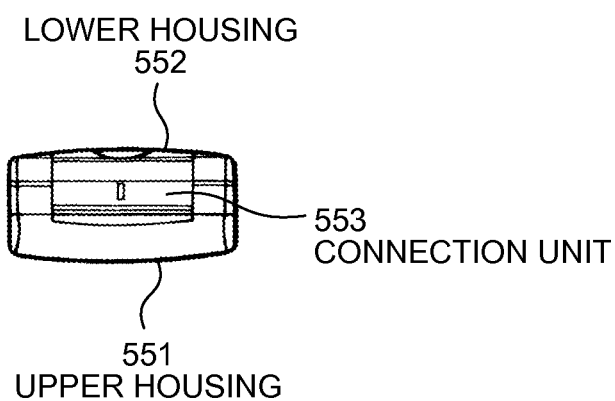
FIG. 27 is a diagram illustrating the example of the electronic apparatus to which the display device with the touch detection function or the display device according to the embodiment and modifications is applied.
Figure 28:
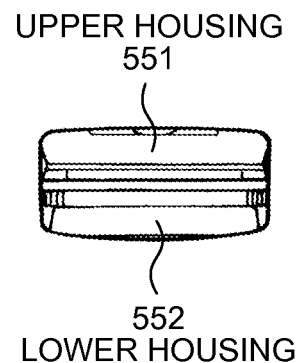
FIG. 28 is a diagram illustrating the example of the electronic apparatus to which the display device with the touch detection function or the display device according to the embodiment and modifications is applied.

The electronic apparatus illustrated in FIG. 21 is a laptop computer to which the display device with the touch detection function 1 or the display device according to the embodiment and the modifications thereof is applied. This laptop computer includes, for example, a body 541, a keyboard 542 for input operation of characters, for example, and a display unit 543 that displays images. The display unit 543 corresponds to the display device with the touch detection function 1 or the display device according to the embodiment and the modifications thereof.

Application Example 5

The electronic apparatus illustrated in FIGS. 22 to 29 is a mobile phone to which the display device with the touch detection function 1 or the display device according to the embodiment and the modifications thereof is applied. This mobile phone is, for example, composed of an upper housing 551 and a lower housing 552 connected to each other by a connection unit (hinge unit) 553, and includes a display 554, a subdisplay 555, a picture light 556, and a camera 557. The display 554 and/or the subdisplay 555 correspond(s) to the display device with the touch detection function 1 or the display device according to the embodiment and the modifications thereof.

Application Example 6

Figure 29:
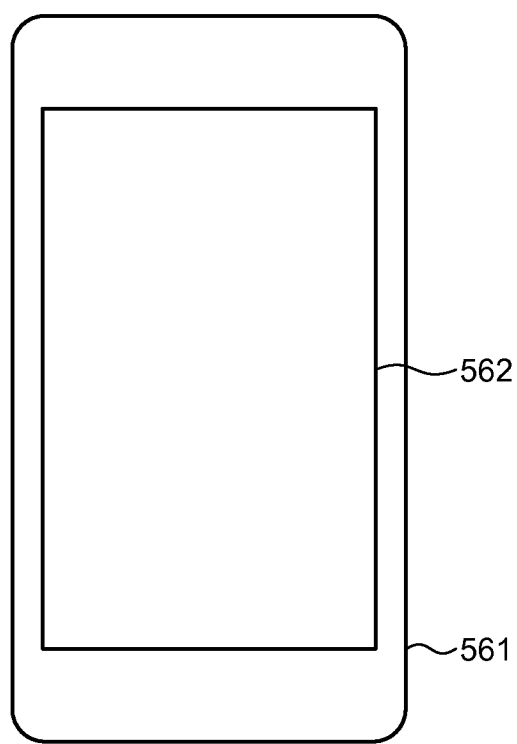
FIG. 29 is a diagram illustrating an example of an electronic apparatus to which the display device with the touch detection function or the display device according to the embodiment and modifications is applied.

The electronic apparatus illustrated in FIG. 29 is a portable information terminal that operates as a portable computer, a multifunctional mobile phone, a portable computer with voice call capability, or a portable computer with communication capability, and that is sometimes called a smartphone or a tablet computer. This portable information terminal includes, for example, a display unit 562 on a surface of a housing 561. The display unit 562 corresponds to the display device with the touch detection function 1 or the display device according to the embodiment and the modifications thereof.

3. Aspects of Present Disclosure

The present disclosure includes the following aspects.
(I) A display device with a touch detection function comprising:
  a substrate;
  a display area in which pixels each constituted by different color regions are arranged in a matrix in a plane parallel to a surface of the substrate and that includes color columns in which the color regions of the same colors extend side by side;
  a touch detection electrode that includes a plurality of conductive thin wires extending in a plane parallel to the surface of the substrate; and
  a drive electrode that has electrostatic capacitance with respect to the touch detection electrode, wherein
  each of the conductive thin wires includes a plurality of portions at each of which the conductive thin wire extends in a direction at an angle with respect to a direction of extension of the color regions, and a plurality of bent portions at each of which the conductive thin wire is bent with the angle changed, and
  the conductive thin wires include portions each overlapping all of the color columns in a direction orthogonal to the surface of the substrate.
(II) The display device with the touch detection function according to (I), wherein
  all of the conductive thin wires have the same shape; and
  the display device satisfies the following formula (1):

$$P<b+d \qquad (1)$$

where a direction orthogonal to the direction of extension of the color regions of the same colors in the plane parallel to the surface of the substrate is defined as a color region orthogonal direction, an interval between the adjacent conductive thin wires in the color region orthogonal direction is denoted by P, a minimum length of an offset in the color region orthogonal direction from one of the bent portions to another bent portion next to the bent portion in the same one of the conductive thin wires is denoted by b, and a width in the color region orthogonal direction of each of the color regions is denoted by d.
(III) The display device with the touch detection function according to (II), further satisfying the following formula (2):

$$b \leq P \qquad (2).$$

(IV) The display device with the touch detection function according to (II), further satisfying the following formula (3):

$$P \leq 160 \ \mu m \qquad (3).$$

(V) An electronic apparatus comprising:
  a display device with a touch detection function that comprises:
  a substrate;
  a display area in which pixels each constituted by different color regions are arranged in a matrix in a plane parallel to a surface of the substrate and that includes color columns in which the color regions of the same colors extend side by side;
  a touch detection electrode that includes a plurality of conductive thin wires extending in a plane parallel to the surface of the substrate; and
  a drive electrode that has electrostatic capacitance with respect to the touch detection electrode, wherein
  each of the conductive thin wires includes a plurality of portions at each of which the conductive thin wire extends in a direction at an angle with respect to a direction of extension of the color regions, and a plurality of bent portions at each of which the conductive thin wire is bent with the angle changed, and
  the conductive thin wires include portions each overlapping all of the color columns in a direction orthogonal to the surface of the substrate.

A display device with a touch detection function and an electronic apparatus of the present disclosure can reduce the possibility of a moire pattern being seen, while including touch detection electrodes of an electrically conductive material such as a metallic material.

An electronic apparatus of the present disclosure includes the above-described display device with a touch detection function. Examples of the electronic apparatus of the present disclosure include, but are not limited to, a television device, a digital camera, a personal computer, a video camera, and a portable electronic apparatus such as a mobile phone.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:
   a substrate;
   a display area in which pixels each constituted by a plurality of different color regions corresponding to a plurality of different colors are arranged in a matrix in a plane parallel to a surface of the substrate and that includes color columns in each of which the color regions of a same color extend side by side;
   a touch detection electrode that includes a plurality of conductive thin wires extending in a plane parallel to the surface of the substrate; and
   a drive electrode that has electrostatic capacitance with respect to the touch detection electrode, wherein
   each of the conductive thin wires is made of a light-shielding metallic material,
   a direction of extension of the touch detection electrode is equal to a direction of extension of the color columns,
   each of the conductive thin wires includes a plurality of line portions at each of which the conductive thin wires extend in a direction at an angle with respect to the direction of extension of the color columns, and a plurality of bent portions at each of which the conductive thin wires are bent with the angle changed,
   in each conductive thin wire, each line portion is sandwiched between adjacent bent portions,
   each line portion included in each of the conductive thin wires includes portions each overlapping all of the plurality of different colors in a direction orthogonal to the surface of the substrate,
   each of the conductive thin wires has a width less than d, where a direction orthogonal to the direction of extension of the color columns of the same colors in the plane parallel to the surface of the substrate is defined as a color region orthogonal direction, and a width in the color region orthogonal direction of each of the color regions is denoted by d,
   P has a different length from b, where an interval between adjacent conductive thin wires in the color region orthogonal direction is denoted by P, and a length of an offset in the color region orthogonal direction from one of the bent portions to another bent portion next to the bent portion in the same one of, and on the same side of, the conductive thin wires is denoted by b,
   the adjacent conductive thin wires include a first conductive thin wire and a second conductive thin wire adjacent to the first conductive thin wire,
   a color of the color region at a first bent portion included in the first conductive thin wire is different from a color of the color region at a second bent portion included in the second conductive thin wire, the first bent portion and the second bent portion being at the same position in the direction of extension of the color columns, and the following formulas (2a) and (2b) are satisfied:

$$b<P \quad (2a),\text{ and}$$

$$b>3d \quad (2b).$$

2. The display device with the touch detection function according to claim 1, further satisfying the following formula (1):

$$P<b+d \quad (1).$$

3. The display device with the touch detection function according to claim 2, wherein
   at least one of the conductive thin wires has a plurality of the lengths b, the lengths b being different from each other, and
   b in the formula (1) is a minimum length of the lengths b.

4. The display device with the touch detection function according to claim 1, further satisfying the following formula (3):

$$P \leq 160 \text{ μm} \quad (3).$$

5. The display device with the touch detection function according to claim 1, wherein
   the conductive thin wires each have a zigzag-line shape in which the line portions and the bent portions are alternately arranged.

6. The display device with the touch detection function according to claim 1, wherein
   an angle of each line portion with respect to the direction of extension of the color columns of the same color is in a range of 30 degrees to 40 degrees, or 50 degrees to 60 degrees.

7. The display device with the touch detection function according to claim 1, wherein
   at least one of the conductive thin wires has a plurality of the lengths b, the lengths b being different from each other.

8. The display device with the touch detection function according to claim 1, wherein
   at least one of the conductive thin wires has a plurality of the lengths b, the lengths b being different from each other, and
   b in the formula (2a) is a minimum length of the lengths b.

9. An electronic apparatus comprising:
   a display device with a touch detection function that comprises:
   a substrate;
   a display area in which pixels each constituted by a plurality of different color regions corresponding to a plurality of different colors are arranged in a matrix in a plane parallel to a surface of the substrate and that includes color columns in each of which the color regions of a same color extend side by side;
   a touch detection electrode that includes a plurality of conductive thin wires extending in a plane parallel to the surface of the substrate; and
   a drive electrode that has electrostatic capacitance with respect to the touch detection electrode, wherein
   each of the conductive thin wires is made of a light-shielding metallic material,
   a direction of extension of the touch detection electrode is equal to a direction of extension of the color columns,
   each of the conductive thin wires includes a plurality of line portions at each of which the conductive thin wires extend in a direction at an angle with respect to the direction of extension of the color columns, and a plurality of bent portions at each of which the conductive thin wires are bent with the angle changed, in each conductive thin wire, each line portion is sandwiched between adjacent bent portions, each line portion included in each of the conductive thin wires includes portions each overlapping all of the plurality of different colors in a direction orthogonal to the surface of the substrate, each of the conductive thin wires has a width less than d, where a direction orthogonal to the direction f extension of the color columns of the same colors in the plane parallel to the surface of the substrate is defined as a color region orthogonal direction, and a width in the color region orthogonal direction of each of the color regions is denoted by d, P has a different length from b, where an interval between adjacent conductive thin wires in the color region orthogonal direction is denoted by P, and a length of an offset in the color region orthogonal direction from one of the bent portions to another bent portion next to the bent portion in the same one of, and on the same side of, the conductive thin wires is denoted by b, the adjacent conductive thin wires include a first conductive thin wire and a second conductive thin wire, a color of the color region at a first bent portion included in the first conductive thin wire is different from a color of the color region at a second bent portion included in the second conductive thin wire, the first bent portion and the second bent portion being at the same position in the direction of extension of the color columns, and the following formulas (2a) and (2b) are satisfied:

$$b<P \qquad (2a), \text{ and}$$

$$b>3d \qquad (2b).$$

* * * * *